(12) United States Patent
Kim et al.

(10) Patent No.: US 10,824,518 B2
(45) Date of Patent: Nov. 3, 2020

(54) MEMORY SYSTEM AND OPERATING METHOD THEREOF

(71) Applicant: SK hynix Inc., Gyeonggi-do (KR)

(72) Inventors: Young Ho Kim, Gyeonggi-do (KR); Yong Jin, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 188 days.

(21) Appl. No.: 15/953,006

(22) Filed: Apr. 13, 2018

(65) Prior Publication Data

US 2019/0087284 A1 Mar. 21, 2019

(30) Foreign Application Priority Data

Sep. 20, 2017 (KR) .......................... 10-2017-0121108

(51) Int. Cl.
| | | |
|---|---|---|
| *G06F 11/00* | (2006.01) | |
| *G06F 11/14* | (2006.01) | |
| *G06F 3/06* | (2006.01) | |
| *G06F 12/02* | (2006.01) | |

(52) U.S. Cl.
CPC .......... *G06F 11/1469* (2013.01); *G06F 3/064* (2013.01); *G06F 3/065* (2013.01); *G06F 3/0619* (2013.01); *G06F 3/0679* (2013.01); *G06F 3/0688* (2013.01); *G06F 11/1448* (2013.01); *G06F 12/0246* (2013.01)

(58) Field of Classification Search
CPC .......................... G06F 11/1469; G06F 11/1448
See application file for complete search history.

(56) References Cited

U.S. PATENT DOCUMENTS

| | | | |
|---|---|---|---|
| 2014/0281145 A1* | 9/2014 | Tomlin ................ | G06F 12/0246 711/103 |
| 2018/0150357 A1* | 5/2018 | Shen ..................... | G06F 11/073 |

FOREIGN PATENT DOCUMENTS

| | | |
|---|---|---|
| KR | 1020110139956 | 12/2011 |
| KR | 101676175 | 11/2016 |

* cited by examiner

*Primary Examiner* — Katherine Lin
(74) *Attorney, Agent, or Firm* — IP & T Group LLP

(57) ABSTRACT

There are provided a memory system and an operating method thereof. A method for operating a memory system includes: performing a program operation on a first page of a first page group included in a first memory block and storing physical-logical address mapping information on the first page in a physical-logical address mapping information storing section; performing a program operation on a second page of the first page group included in the first memory block and storing physical-logical address mapping information on the second page in the physical-logical address mapping information storing section; and copying the physical-logical address mapping information on the first and second pages of the first page group, which are stored in the physical-logical address mapping information storing section, to a second memory block.

10 Claims, 17 Drawing Sheets

MEMORY SYSTEM AND OPERATING METHOD THEREOF

CROSS-REFERENCE TO RELATED APPLICATION

The present application claims priority under 35 U.S.C. § 119(a) to Korean patent application number 10-2017-0121108, filed on Sep. 20, 2017, the entire disclosure of which is incorporated herein by reference.

BACKGROUND

1. Field of Invention

Various embodiments of the present disclosure generally relate to a memory system and an operating method thereof. Particularly, the embodiments relate to a memory system including a single level cell (SLC) memory block configured to store physical-logical address mapping information to perform a power loss recovery operation using the SLC memory block when power loss occurs, and an operating method of the memory system.

2. Description of Related Art

A memory device may include a plurality of memory blocks, each of which may include a plurality of memory cells. An erase operation may be performed on memory cells included in one memory block.

A memory system may include a plurality of memory devices. Also, the memory system may divide a plurality of memory blocks included in the plurality of memory devices into a plurality of super blocks configured with two or more memory blocks. Such management in units of super blocks enables the memory system to efficiently manage a plurality of memory blocks.

The memory system may include a DRAM for storing physical-logical address mapping information. The physical-logical address mapping information stored in the DRAM may be lost when power loss occurs in the memory system. Thus, an operation of recovering the physical-logical address mapping information lost in the DRAM is required.

SUMMARY

Embodiments provide a memory system capable of performing an efficient power loss recovery operation and an operating method of the memory system.

According to an aspect of the present disclosure, there is provided a method for operating a memory system, the method including: performing a program operation on a first page of a first page group included in a first memory block and storing physical-logical address mapping information on the first page in a physical-logical address mapping information storing section; performing a program operation on a second page of the first page group included in the first memory block and storing physical-logical address mapping information on the second page in the physical-logical address mapping information storing section; and copying the physical-logical address mapping information on the first and second pages of the first page group, which are stored in the physical-logical address mapping information storing section, to a second memory block.

According to an aspect of the present disclosure, there is provided a method for operating a memory system, the method including a recovery phase of recovering physical-logical address mapping information on a multi-level cell (MLC) memory block, if power loss occurs, wherein the recovery phase includes: recovering the physical-logical address mapping information on a first page group of the MLC memory block by scanning an SLC memory block allocated as a system block of the MLC memory block; and recovering the physical-logical address mapping information on one or more pages of a second page group included in the MLC memory block by scanning the one or more pages of the second page group.

According to an aspect of the present disclosure, there is provided a memory system including: a super block including first and second page groups; a RAM configured to temporarily store physical-logical address mapping information on the super block; a system block configured to copy the physical-logical address mapping information stored in the RAM; and a physical-logical address mapping information control section configured to recover the physical-logical address mapping information on the super block in the RAM, if power loss occurs, wherein, if the power loss occurs while a program operation is being performed on the second page group, the physical-logical address mapping information control section recovers physical-logical address mapping information on the first page group by scanning the system block, and recovers physical-logical address mapping information on one or more pages of the second page group of the super block, on which the program operation is performed, by scanning the one or more pages of the second page group.

According to an aspect of the present disclosure, there is provided a memory system including: a memory device including first and second memory blocks; and a controller including a volatile memory, and suitable for: controlling the memory device to program user data and physical-logical address mapping information of the user data in first and second regions of the first memory block, respectively; storing the physical-logical address mapping information in the volatile memory; and controlling the memory device to copy the physical-logical address mapping information from the volatile memory into a third region of the first memory block when the first region is full of the user data, wherein the controller further controls the memory device to temporarily copy the physical-logical address mapping information from the volatile memory into the second memory block until the physical-logical address mapping information is copied into the third region, wherein the controller further rebuilds the physical-logical address mapping information, which is lost in the volatile memory due to a sudden power-off, using the physical-logical address mapping information programmed in the second region and the second memory block.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive.

In the entire specification, when an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

The terminology used herein is for the purpose of describing particular embodiments only and is not intended to be limiting of the present invention.

As used herein, singular forms may include the plural forms as well, unless the context clearly indicates otherwise.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

Hereinafter, the various embodiments of the present invention will be described in detail with reference to the attached drawings.

Figure 1:
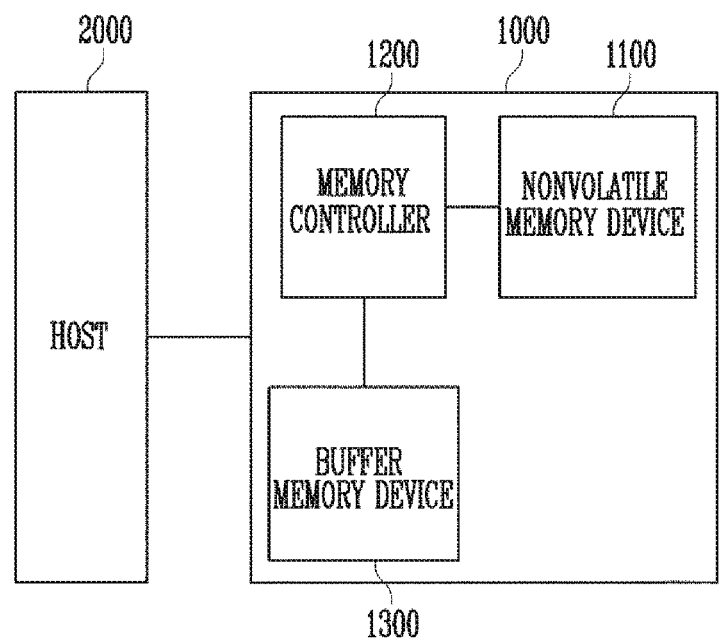
FIG. 1 is a diagram illustrating a memory system according to an embodiment of the present disclosure.

FIG. 1 is a diagram illustrating a memory system 1000 according to an embodiment of the present disclosure.

Referring to FIG. 1, the memory system 1000 may include a nonvolatile memory device 1100 that retains stored data even when power is cut off, a buffer memory device 1300 for temporarily storing data, and a memory controller 1200 that controls the nonvolatile memory device 1100 and the buffer memory device 1300 under the control of a host 2000.

The host 2000 may communicate with the memory system 1000, using at least one of various communication manners, such as a universal serial bus (USB), a serial AT attachment (SATA), a high speed interchip (HSIC), a small computer system interface (SCSI), Firewire, a peripheral component interconnection (PCI), a PCI express (PCIe), a nonvolatile memory express (NVMe), a universal flash storage (UFS), a secure digital (SD), a multimedia card (MMC), an embedded MMC (eMMC), a dual in-line memory module (DIMM), a registered DIMM (RDIMM), a load reduced DIMM (LRDIMM), and the like.

The memory controller 1200 may control overall operations of the memory system 1000, and control data exchange between the host 2000 and the nonvolatile memory device 1100. For example, the memory controller 1200 may program or read data by controlling the nonvolatile memory device 1100 in response to a request of the host 2000. Also, the memory controller 1200 may store information of main memory blocks and sub-memory blocks, which are included in the nonvolatile memory device 1100, and select the nonvolatile memory device 1100 to perform a program operation on a main memory block or a sub-memory block according to the amount of data loaded for the program operation. In some embodiments, the nonvolatile memory device 1100 may include a flash memory.

The memory controller 1200 may control data exchange between the host 2000 and the buffer memory device 1300, or temporarily store system data for controlling the nonvolatile memory device 1100 in the buffer memory device 1300. The buffer memory device 1300 may be used as a working memory, a cache memory, or a buffer memory of the memory controller 1200. The buffer memory device 1300 may store codes and commands, which are executed by the memory controller 1200. Also, the buffer memory device 1300 may store data processed by the memory controller 1200.

The memory controller 1200 may temporarily store data input from the host 200 in the buffer memory device 1300 and then transmit the data temporarily stored in the buffer memory device 1300 to the nonvolatile memory device 1100 to be stored in the nonvolatile memory device 1100. Also, the memory controller 1200 may receive data and a logical address, which are input from the host 2000, and transform the logical address to a physical address indicating a region in which data is to be actually stored in the nonvolatile memory device 1100. Also, the memory controller 1200 may store, in the buffer memory device 1300, a logical-to-physical address mapping table that establishes a mapping relationship between the logical address and the physical address.

In some embodiments, the buffer memory device 1300 may include a double data rate synchronous dynamic random access memory (DDR SDRAM), a low power double data rate 4 (LPDDR4) SDRAM, a graphics double data rate (GDDR) SRAM, a low power DDR (LPDDR), a rambus dynamic random access memory (RDRAM), etc.

Figure 2:
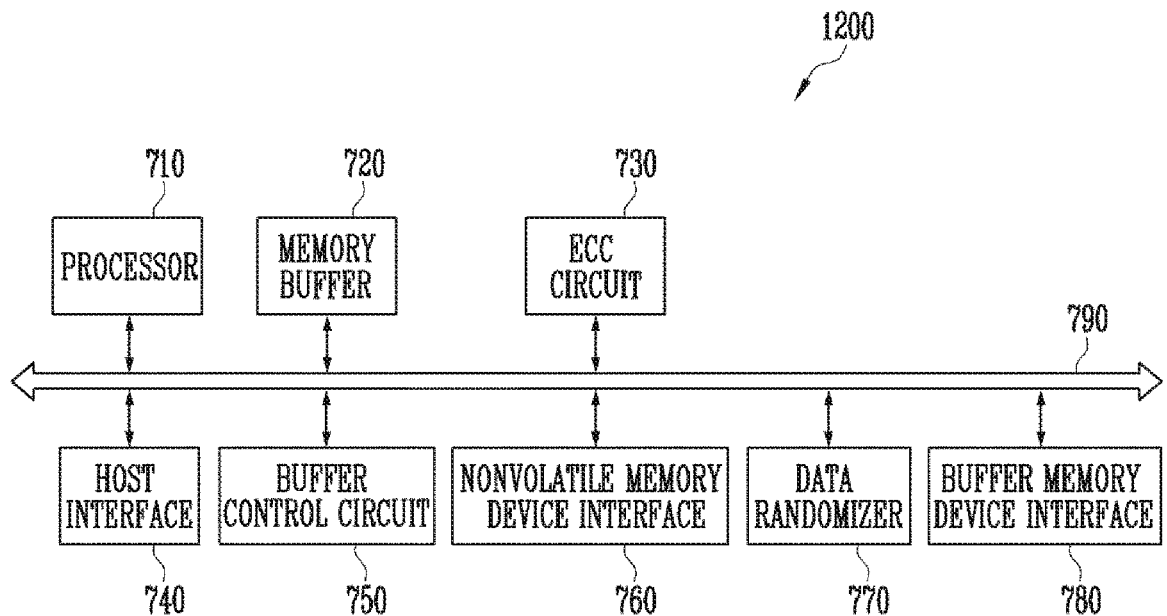
FIG. 2 is a diagram illustrating a memory controller of FIG. 1.

FIG. 2 is a diagram illustrating the memory controller 1200 of FIG. 1.

Referring to FIG. 2, the memory controller 1200 may include a processor 710, a memory buffer 720, an error correction code (ECC) circuit 730, a host interface 740, a buffer control circuit 750, a nonvolatile memory device interface 760, a data randomizer 770, a buffer memory device interface 780, and a bus 790.

The bus 790 may provide channels between components of the memory controller 1200.

The processor 710 may control overall operations of the memory controller 1200, and perform a logical operation. The processor 710 may communicate with the external host 2000 through the host interface 740, and communicate with the nonvolatile memory device 1100 through the nonvolatile memory device interface 760. Also, the processor 710 may communicate with the buffer memory device 1300 through the buffer memory device interface 780. Also, the processor 710 may control the memory buffer 720 through the buffer control circuit 750. The processor 710 may control an operation of the memory system 1000 by using the memory buffer 720 as a working memory, a cache memory, or a buffer memory.

The processor 710 may queue a plurality of commands input from the host 2000. Such an operation is referred to as a multi-queue. The processor 710 may sequentially transfer a plurality of queued tags to the nonvolatile memory device 1100.

The memory buffer 720 may be used as the working memory, the cache memory, or the buffer memory of the processor 710. The memory buffer 720 may store codes and commands, which are executed by the processor 710. The memory buffer 720 may include a static RAM (SRAM) or a dynamic RAM (DRAM).

The ECC circuit 730 may perform an ECC operation. The ECC circuit 730 may perform ECC encoding on data to be written in the nonvolatile memory device 1100 through the nonvolatile memory device interface 760. The ECC encoded data may be transferred to the nonvolatile memory device 1100 through the nonvolatile memory device interface 760. The ECC circuit 730 may perform ECC decoding on data received from the nonvolatile memory device 1100 through the nonvolatile memory device interface 760. In an embodiment, the ECC circuit 730 may be included, for example, as a component of the nonvolatile memory device interface 760 in the nonvolatile memory device interface 760.

The host interface 740 is configured to communicate with the external host 2000 under the control of the processor 710. The host interface 740 may communicate with the host 2000, using at least one of various communication manners, such as a universal serial bus (USB), a serial AT attachment (SATA), a high speed interchip (HSIC), a small computer system interface (SCSI), Firewire, a peripheral component interconnection (PCI), a PCI express (PCIe), a nonvolatile memory express (NVMe), a universal flash storage (UFS), a secure digital (SD), a multimedia card (MMC), an embedded MMC (eMMC), a dual in-line memory module (DIMM), a registered DIMM (RDIMM), and a load reduced DIMM (LRDIMM).

The buffer control circuit 750 is configured to controller the memory buffer 720 under the control of the processor 710.

The nonvolatile memory device interface 760 is configured to communicate with the nonvolatile memory device 1100 under the control of the processor 710. The nonvolatile memory device interface 760 may communicate a command, an address, and data with the nonvolatile memory device 1100 through a channel.

Depending on an embodiment, the memory controller 1200 may or may not include the memory buffer 720 and the buffer control circuit 750.

As an example, the processor 710 may control an operation of the memory controller 1200 using codes. The processor 710 may load codes from a nonvolatile memory device (e.g., a read only memory (ROM)) provided inside the memory controller 1200. As another example, the processor 710 may load codes from the nonvolatile memory device 1100 through the nonvolatile memory device interface 760.

A data randomizer 770 may randomize data or de-randomize the randomized data. The data randomizer 770 may perform a data randomizing operation on data to be written in the nonvolatile memory device 1100 through the nonvolatile memory device interface 760. The randomized data may be transferred to the nonvolatile memory device 1100 through the nonvolatile memory device interface 760. The data randomizer 770 may perform a data de-randomizing operation on data received from the nonvolatile memory device 1100 through the nonvolatile memory device interface 760. As an example, the data randomizer 770 may be included as a component of the nonvolatile memory device interface 760 in the nonvolatile memory device interface 760.

In an embodiment, the bus 790 of the memory controller 1200 may be divided into a control bus and a data bus. The data bus may be configured to transmit data in the memory controller 1200, and the control bus may be configured to transmit control information such as a command and an address in the memory controller 1200. The data bus and the control bus are separated from each other, and may not interfere or influence with each other. The data bus may be coupled to the host interface 740, the buffer control circuit 750, the ECC circuit 730, the nonvolatile memory device interface 760, and the buffer memory device interface 780. The control bus may be coupled to the host interface 740, the processor 710, the buffer control circuit 750, the nonvolatile memory device interface 760, and the buffer memory device interface 780.

The buffer memory device interface 780 may communicate with the buffer memory device 1300 under the control of the processor 710. The buffer memory device interface 780 may communicate a command, an address, and data with the buffer memory device 1300 through a channel.

Figure 3:
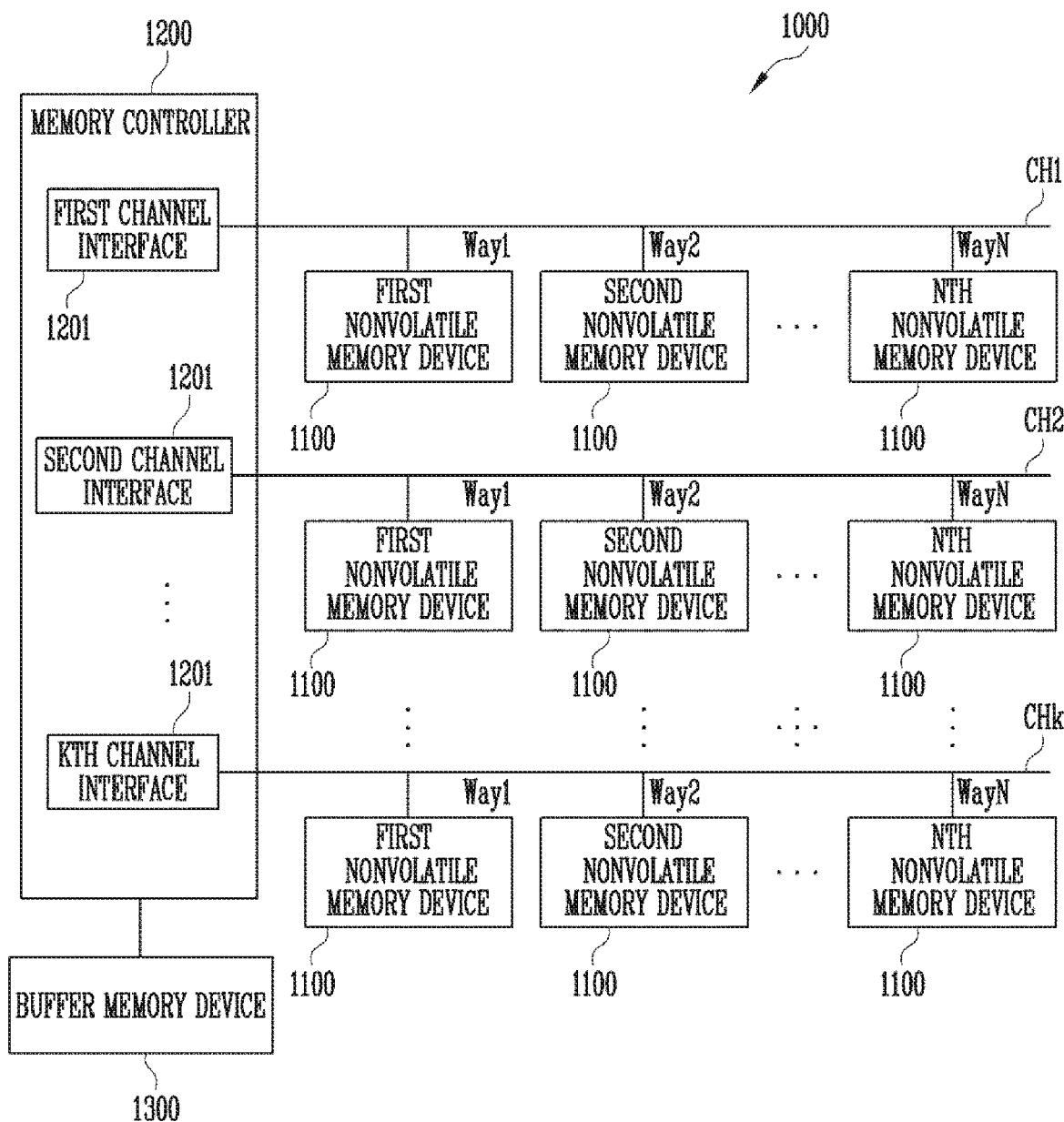
FIG. 3 is a diagram illustrating a memory system according to another embodiment of the present disclosure.

FIG. 3 is a diagram illustrating a memory system according to another embodiment of the present disclosure. Specifically, FIG. 3 illustrates a memory system 1000 including a plurality of nonvolatile memory devices 1100 coupled to a memory controller 1200 through a plurality of channels CH1 to CHk.

Referring to FIG. 3, the memory controller 1200 may communicate with the plurality of nonvolatile memory devices 1100 through the plurality of channels CH1 to CHk. The memory controller 1200 may include a plurality of channel interfaces 1201, and each of the plurality of channels CH1 to CHk may be coupled to any one of the plurality of channel interfaces 1201. As an example, a first channel CH1 may be coupled to a first channel interface 1201, a second channel CH2 may be coupled to a second channel interface 1201, and a kth channel CHk may be coupled to a kth channel interface 1201. Each of the plurality of channels CH1 to CHk may be coupled to one or more nonvolatile memory devices 1100. In addition, each of the nonvolatile memory devices 1100 coupled to different channels may operate independently. In other words, the nonvolatile memory device 1100 coupled to the first channel CH1 and the nonvolatile memory device 1100 coupled to the second channel CH2 may operate independently. As an example, the memory controller 1200 may communicate, in parallel, data or commands with the nonvolatile memory device 1100 coupled to the second channel CH2 through the second channel CH2 while communicating data or commands with the nonvolatile memory device 1100 coupled to the first channel CH1 through the first channel CH1.

Each of the plurality of channels CH1 to CHk may be coupled to a plurality of nonvolatile memory devices 1100. In this case, a plurality of nonvolatile memory devices 1100 coupled to one channel may constitute different ways. As an example, N nonvolatile memory devices 1100 may be coupled to one channel, and constitute different ways. That is, first to Nth nonvolatile memory devices 1100 may be coupled to the first channel CH1. The first nonvolatile memory device 1100 may constitute a first way Way1, the second nonvolatile memory device 1100 may constitute a second way Way2, and the Nth nonvolatile memory device 1100 may constitute an Nth way WayN. However, the present embodiment is not limited thereto. That is, unlike as shown illustrated in FIG. 3, two or more nonvolatile memory devices 1100 may constitute one way.

Since the first to Nth nonvolatile memory devices 1100 coupled to the first channel CH1 share the first channel CH1 with one another, the first to Nth nonvolatile memory devices 1100 cannot simultaneously communicate, in parallel, data or commands with the memory controller 1200 through the first channel CH1. The first to Nth nonvolatile memory devices 1100 may sequentially communicate the data or commands with the memory controller 1200 through the first channel CH1. That is, while the memory controller 1200 is transmitting data to the first nonvolatile memory device 1100 constituting the first way Way1 of the first channel CH1 through the first channel CH1, the second to Nth nonvolatile memory devices 1100 constituting the second to Nth ways Way2 to WayN of the first channel CH1 cannot communicate data or commands with the memory controller 1200 through the first channel CH1. In other words, while any one of the first to Nth nonvolatile memory devices 1100 sharing the first channel CH1 is occupying the first channel CH1, the other nonvolatile memory devices 1100 coupled to the first channel CH1 cannot use the first channel CH1.

The first nonvolatile memory device 1100 constituting the first way Way1 of the first channel CH1 and the first nonvolatile memory device 1100 constituting the first way Way1 of the second channel CH2 may communicate independently from each other with the memory controller 1200. In other words, when the memory controller 1200 communicates data with the first nonvolatile memory device 1100 constituting the first way Way1 of the first channel CH1 through the first channel CH1 and the first channel interface 1201, the memory controller 1200 may simultaneously communicate data with the first nonvolatile memory device 1100 constituting the first way Way1 of the second channel CH2 through the second channel CH2 and the second channel interface 1201.

Figure 4:
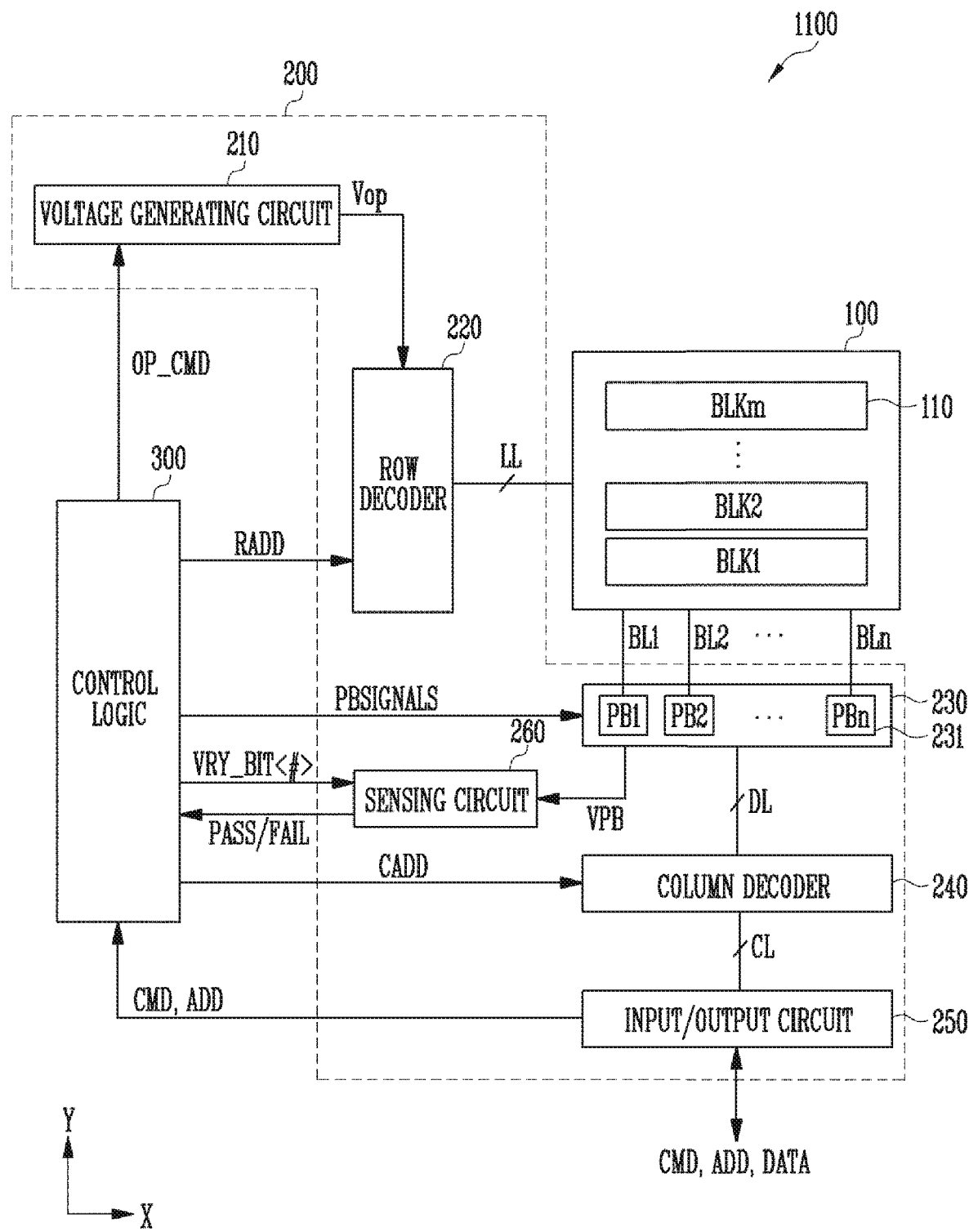
FIG. 4 is a diagram illustrating a nonvolatile memory device of FIG. 1.

FIG. 4 is a diagram illustrating the nonvolatile memory device 1100 of FIG. 1.

Referring to FIG. 4, the nonvolatile memory device 1100 may include a memory cell array 100 that stores data. The nonvolatile memory device 1100 may include peripheral circuits 200 configured to perform a program operation for storing data in the memory cell array 100, a read operation for outputting the stored data, and an erase operation for erasing the stored data. The nonvolatile memory device 1100 may include a control logic 300 that controls the peripheral circuits 200 under the control of the memory controller (1200 of FIG. 1).

The memory cell array 100 may include a plurality of memory blocks BLK1 to BLKm (m is a positive integer) 110. Local lines LL and bit lines BL1 to BLn (n is a positive integer) may be coupled to the memory blocks BLK1 to BLKm 110. For example, the local lines LL may include a first select line, a second select line, and a plurality of word lines arranged between the first and second select lines. Also, the local lines LL may further include dummy lines arranged between the first select line and the word lines, and between the second select line and the word lines. Here, the first select line may be a source select line, and the second select line may be a drain select line. For example, the local lines LL may include word lines, drain and source select lines, and source lines SL. For example, the local lines LL may further include dummy lines. For example, the local lines LL may further include pipe lines. The local lines LL may be coupled to the memory blocks BLK1 to BLKm 110, respectively, and the bit lines BL1 to BLn may be commonly coupled to the memory blocks BLK1 to BLKm 110. The memory blocks BLK1 to BLKm 110 may be implemented in a two-dimensional or three-dimensional structure. For example, memory cells may be arranged in a direction parallel to a substrate in memory blocks 110 having a two-dimensional structure, or be arranged in a direction vertical to a substrate in memory blocks 110 having a three-dimensional structure.

The peripheral circuits 200 may be configured to perform program, read, and erase operations of a selected memory block 110 under the control of the control logic 300. For example, the peripheral circuits 200, under the control of the control logic 300, may supply verify and pass voltages to the first select line, the second select line, and the word lines, selectively discharge the first select line, the second select line, and the word lines, and verify memory cells coupled a selected word line among the word lines. For example, the peripheral circuits 200 may include a voltage generating circuit 210, a row decoder 220, a page buffer group 230, a column decoder 240, an input/output circuit 250, and a sensing circuit 260.

The voltage generating circuit 210 may generate various operating voltages Vop used for program, read, and erase operations in response to an operation signal OP_CMD. Also, the voltage generating circuit 210 may selectively discharge the local lines LL in response to the operation signal OP_CMD. For example, the voltage generating circuit 210 may generate a program voltage, a verify voltage, pass voltages, a turn-on voltage, a read voltage, an erase voltage, a source line voltage, and the like under the control of the control logic 300.

The row decoder 220 may transfer the operating voltages Vop to local lines LL coupled to a selected memory block 110 in response to a row address RADD.

The page buffer group 230 may include a plurality of page buffers PB1 to PBn 231 coupled to the bit lines BL1 to BLn. The page buffers PB1 to PBn 231 may operate in response to page buffer control signals PBSIGNALS. For example, the page buffers PB1 to PBn 231 may temporarily store data received through the bit lines BL1 to BLn, or sense voltages or current of the bit lines BL1 to BLn in a read or verify operation.

The column decoder 240 may transfer data between the input/output circuit 250 and the page buffer group 230 in response to a column address CADD. For example, the column decoder 240 may exchange data with the page buffers 231 through data lines DL, or exchange data with the input/output circuit 250 through column lines CL.

The input/output circuit 250 may transfer a command CMD and address ADD, which are received from the memory controller (1200 of FIG. 1), to the control logic 300, or exchange data DATA with the column decoder 240.

The sensing circuit 260, in a read operation and a verify operation, may generate a reference current in response to a permission bit VRY_BIT<#>, and output a pass signal PASS or a fail signal FAIL by comparing a sensing voltage VPB received from the page buffer group 230 with a reference voltage generated by the reference current.

The control logic 300 may control the peripheral circuits 200 by outputting the operation signal OP_CMD, the row address RADD, the page buffer control signals PBSIGNALS, and the permission bit VRY_BIT<#> in response to the command CMD and the address ADD. Also, the control logic 300 may determine whether the verify operation has passed or failed in response to the pass or fail signal PASS or FAIL.

In an operation of the non-volatile memory device 1100, each memory block BLK1 to BLKm 110 may be a unit of an erase operation. In other words, a plurality of memory cells included in the memory blocks BLK1 to BLKm 110 are simultaneously erased, and may not be selectively erased.

Figure 5:
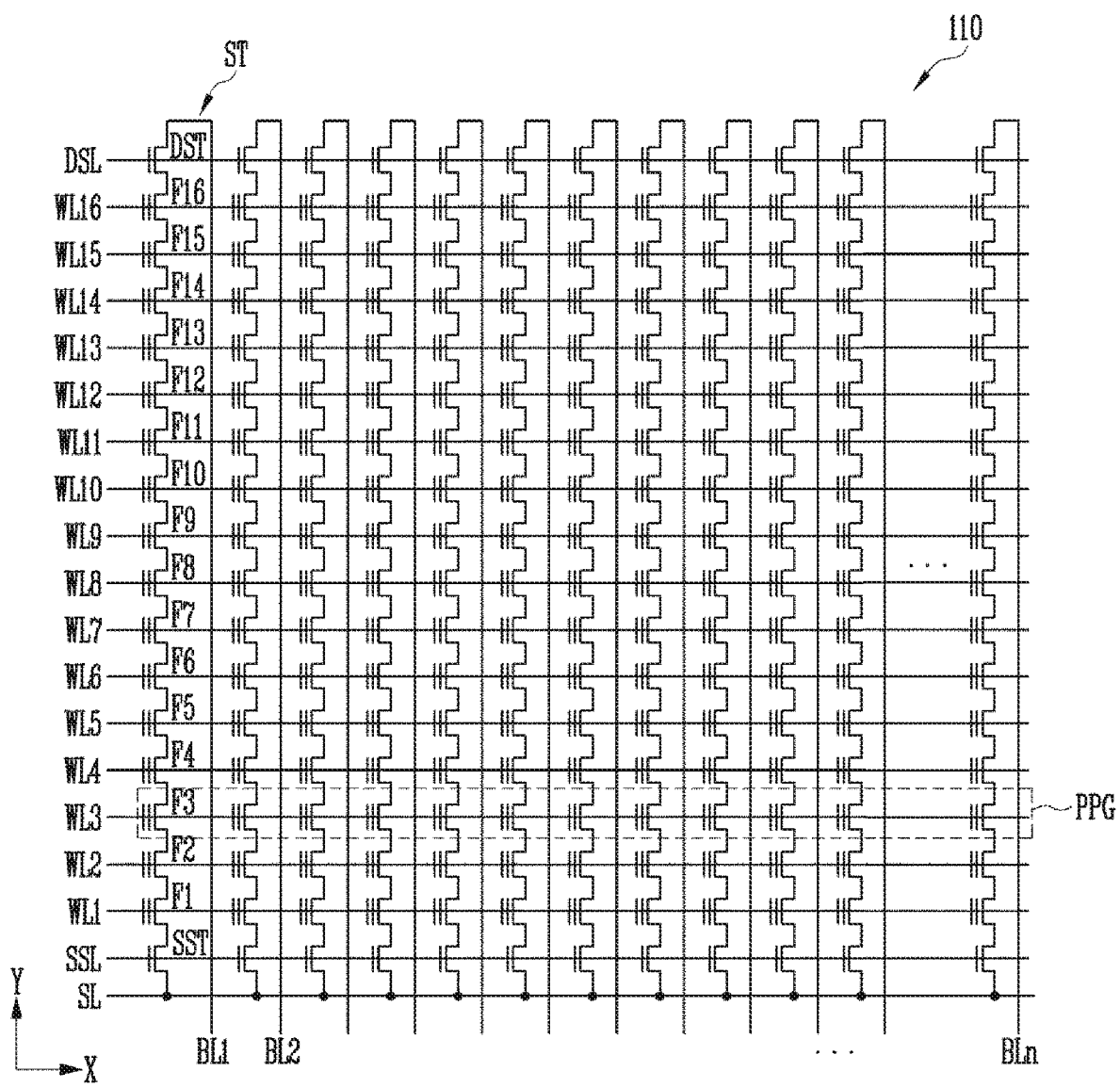
FIG. 5 is a diagram illustrating a memory block of FIG. 4.

FIG. 5 is a diagram illustrating the memory block of FIG. 4.

Referring to FIG. 5, a plurality of word lines WL1 to WL16 arranged in parallel to one another between a first select line and a second select line may be coupled to the memory block 110. Here, the first select line may be a source select line SSL, and the second select line may be a drain select line DSL. More specifically, the memory block 110 may include a plurality of strings ST coupled between bit lines BL1 to BLn and a source line SL. The bit lines BL1 to BLn may be coupled to the strings ST, respectively, and the source line SL may be commonly coupled to the strings ST. The strings ST may be configured identically to one another, and therefore, only one of the strings ST that is coupled to a first bit line BL1 will be described in detail as an example.

The string ST may include a source select transistor SST, a plurality of memory cells F1 to F16, and a drain select transistor DST, which are coupled in series to each other between the source line SL and the first bit line BL1. At least one source select transistor SST and at least one drain select transistor DST may be included in one string ST, and memory cells of which number is larger than that of the memory cells F1 to F16 shown in the drawing may be included in one string ST.

A source of the source select transistor SST may be coupled to the source line SL, and a drain of the drain select transistor DST may be coupled to the first bit line BL1. The memory cells F1 to F16 may be coupled in series between the source select transistor SST and the drain select transistor DST. Gates of source select transistors SST included in different strings ST may be coupled to the source select line SSL, gates of drain select transistors DST included in different strings ST may be coupled to the drain select line DSL, gates of the memory cells F1 to F16 included in different strings ST may be coupled to the plurality of word lines WL1 to WL16. A group of memory cells coupled to the same word line among the memory cells included in different strings ST may be a physical page PPG. Therefore, physical pages PPG of which number corresponds to that of the word lines WL1 to WL16 may be included in the first memory block 110.

One memory cell may store data of one bit. This is generally called as a single level cell (SLC). In this case, one physical page PPG may store one logical page (LPG) data. The one LPG data may include data bits of which number corresponds to that of cells included in one physical page PPG. In addition, one memory cell may store data of two or more bits. This is generally referred to as a multi-level cell (MLC). In this case, one physical page PPG may store two or more LPG data.

A plurality of memory cells included in one physical page PPG may be simultaneously programmed. In other words, the nonvolatile memory device 1100 may perform a program operation in units of physical pages PPG. A plurality of memory cells included in one memory block may be simultaneously erased. In other words, the nonvolatile memory device 1100 may perform an erase operation in units of memory blocks 110. As an example, in order to update a portion of data stored in one memory block 110, after data required to be updated among the entire data is changed by reading the entire data stored in the memory block 110, the entire data may be again programmed in another memory block 110. This is because, when the memory block 110 is a unit of an erase operation in an operation of the nonvolatile memory device 1100, only a portion of the data stored in the memory block 110 is erased, and then the memory block 110 cannot be again programmed with new data. Such a characteristic of the memory device may be one of factors that cause a garbage collection operation to be complicated. In addition, when an error occurs as some of the memory cells included in the memory block 110 are degraded, the corresponding memory block 110 may be treated as a bad block, and all of the memory cells included in the bad block may no longer be used.

Figure 6:
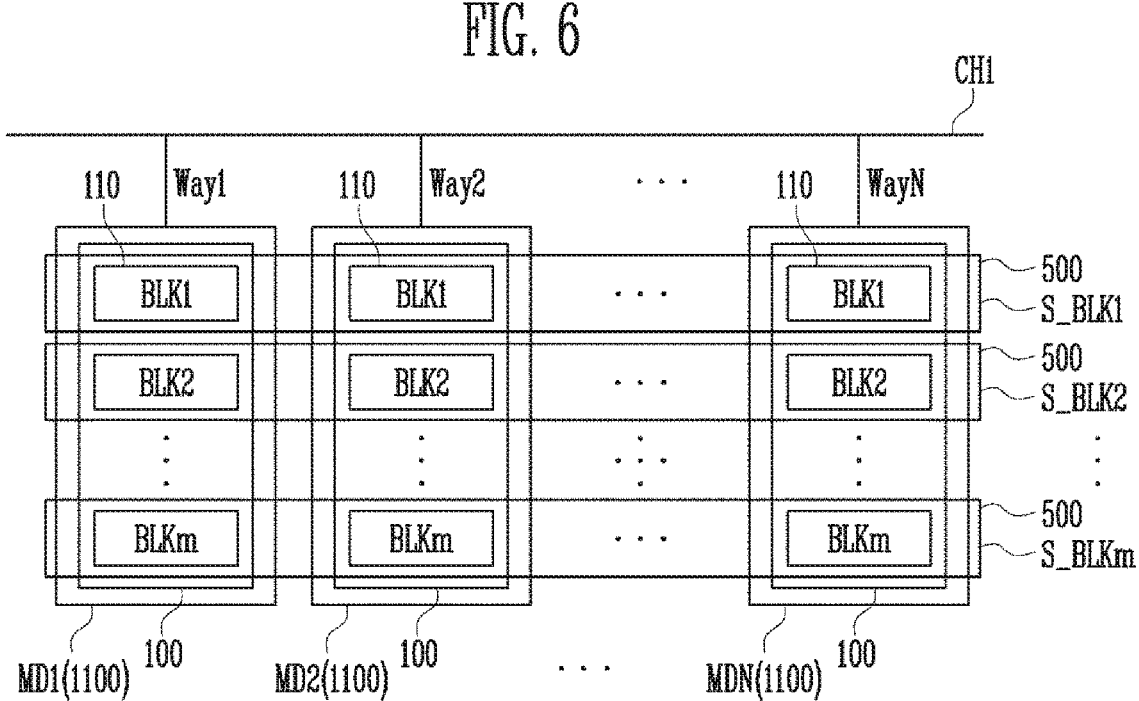
FIG. 6 is a diagram illustrating a super block.

FIG. 6 is a diagram illustrating a super block 500.

Referring to FIG. 6, each of a plurality of ways Way1 to WayN constituting a first channel CH1 may be configured with one or more nonvolatile memory devices 1100. As described above, one nonvolatile memory device 1100 may include a plurality of memory blocks BLK1 to BLKm 110. An erase operation may be independently performed on the memory blocks BLK1 to BLKm 110. An erase operation may be simultaneously performed on a plurality of memory cells included in one memory block 110.

The super block 500 may be configured as a set of selected memory blocks in nonvolatile memory devices 1100 constituting different ways. In other words, a first super block S_BLK1 500 may be configured with a first memory block BLK1 110 included in a first nonvolatile memory device MD1 1100 constituting a first way Way1, a first memory block BLK1 110 included in a second nonvolatile memory device MD2 1100 constituting a second way Way2 to a first memory block BLK1 110 included in an Nth nonvolatile memory device MDN 1100 constituting an Nth way WayN. In addition, a second super block S_BLK2 500 may be configured with a second memory block BLK2 110 included in the first nonvolatile memory device MD1 1100 constituting the first way Way1, a second memory block BLK2 110 included in the second nonvolatile memory device MD2 1100 constituting the second way Way2 to a second memory block BLK2 110 included in the Nth nonvolatile memory device MDN 1100 constituting the Nth way WayN. Similarly, an mth super block S_BLKm 500 may be configured with an mth memory block BLKm 110 included in the first nonvolatile memory device MD1 1100 constituting the first way Way1, an mth memory block BLKm 110 included in the second nonvolatile memory device MD2 1100 constituting the second way Way2 to an mth memory block BLKm 110 included in the Nth nonvolatile memory device MDN 1100 constituting the Nth way WayN.

A plurality of memory blocks included in one super block 500 are physically different memory blocks, but may logically operate as one memory block. In other words, the plurality of memory blocks included in the one super block 500 may be simultaneously programmed or erased. The memory system 1000 performs a program or erase operation in units of super blocks, thereby improving the performance of an erase operation. Also, the memory system 1000 performs an operation such as garbage collection or wear leveling in units of super blocks, thereby more efficiently managing a plurality of memory blocks.

Figure 7:
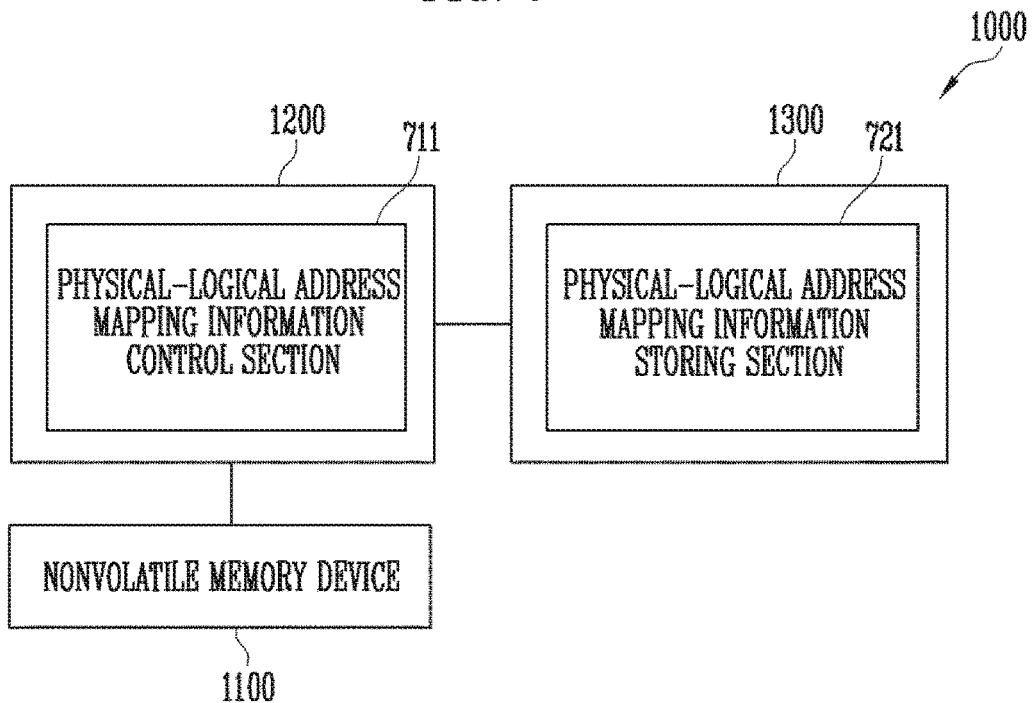
FIG. 7 is a diagram illustrating a memory system according to another embodiment of the present disclosure.

FIG. 7 is a diagram illustrating a memory system 1000 according to another embodiment of the present disclosure.

Referring to FIG. 7, based on the configuration of the memory system shown in FIGS. 1 to 4, the memory controller 1200 may further include a physical-logical address mapping information control section 711. In addition, the buffer memory device 1300 may include a physical-logical address mapping information storing section 721. The physical-logical address mapping information storing section 721 may be a DRAM.

As an example, when a read command and a logical address corresponding to the read command are input from the host 2000 to the memory system 1000, the physical-logical address mapping information control section 711 of the memory controller 1200 may read a physical address corresponding to the logical address from the physical-logical address mapping information storing section 721 of the buffer memory device 1300. The processor 710 of the memory controller 1200 may perform an operation of reading data corresponding to the read command from the nonvolatile memory device 1100, based on the physical address read from the physical-logical address mapping information storing section 721, and output the read data to the host 2000.

As another example, when a program command, program data, and a logical address corresponding to the program command are input from the host 2000 to the memory system 1000, the physical-logical address mapping information control section 711 of the memory controller 1200 may allocate a memory block 110 and one or more pages of the memory block 110 to store the program data in the nonvolatile memory device 1100, and store into the physical-logical address mapping information storing section 721 of the buffer memory device 1300 physical-logical address mapping information representing mapping relationship between the logical address input from the host 2000 and the physical address of the allocated page in the allocated memory block 110. Then, the processor 710 of the memory controller 1200 may perform an operation of programming the program data in the allocated memory block 110 of the nonvolatile memory device 1100, based on the physical address.

As another example, when the memory controller 1200 performs an erase operation on a memory block 110 included in the nonvolatile memory device 1100, the physical-logical address mapping information control section 711 of the memory controller 1200 may delete physical-logical address mapping information on the erased memory block 110 stored in the physical-logical address mapping information storing section 721 of the buffer memory device 1300.

As another example, when the memory controller 1200 copies data stored in a first memory block 110 to a second memory block 110 in the nonvolatile memory device 1100, the physical-logical address mapping information control section 711 of the memory controller 1200 may delete physical-logical address mapping information on the first memory block 110, which is stored in the physical-logical address mapping information storing section 721 of the buffer memory device 1300, and newly generate physical-logical address mapping information on the second memory block 110.

Figure 8:
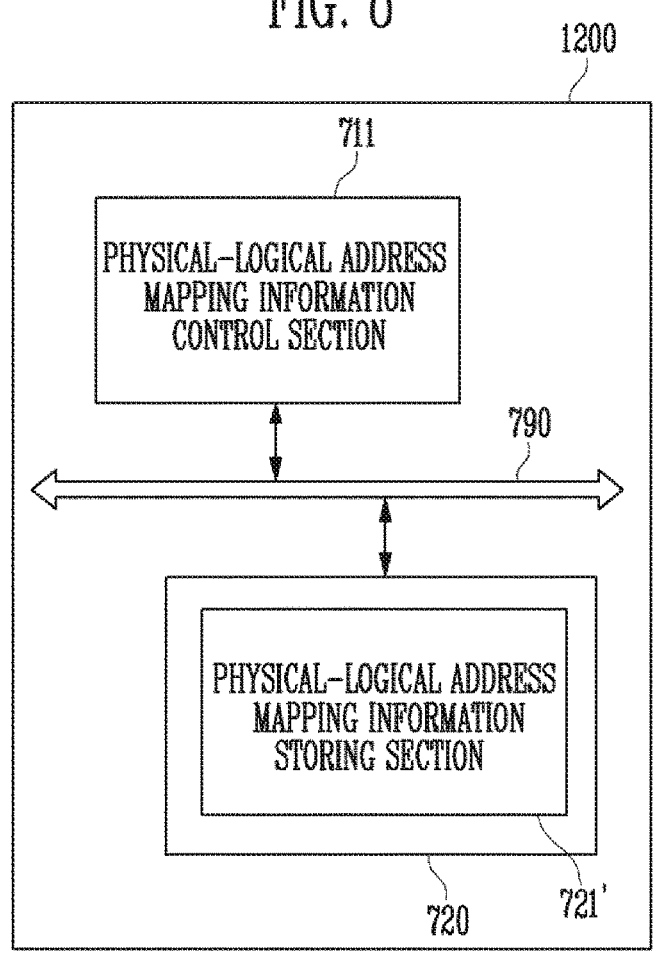
FIG. 8 is a diagram illustrating a memory controller according to another embodiment of the present disclosure.

FIG. 8 is a diagram illustrating a memory controller 1200 according to another embodiment of the present disclosure.

Referring to FIG. 8, based on the configuration of the memory controller shown in FIG. 2, the memory controller 1200 may further include a physical-logical address mapping information control section 711, and the memory buffer 720 may include a physical-logical address mapping information storing section 721'. The physical-logical address mapping information storing section 721' may be an SRAM.

As an example, when a read command and a logical address corresponding to the read command are input from the host 2000 to the memory system 1000, the physical-logical address mapping information control section 711 of the memory controller 1200 may read a physical address corresponding to the logical address from the physical-logical address mapping information storing section 721' of the memory buffer 720. The processor 710 of the memory controller 1200 may perform an operation of reading data corresponding to the read command from the nonvolatile memory device 1100, based on the physical address read from the physical-logical address mapping information storing section 721', and output the read data to the host 2000.

As another example, when a program command, program data, and a logical address corresponding to the program command are input from the host 2000 to the memory system 1000, the physical-logical address mapping information control section 711 of the memory controller 1200 may allocate a memory block 110 and one or more pages of the memory block 110 to store the program data in the nonvolatile memory device 1100, and store into the physical-logical address mapping information storing section 721' of the memory buffer 720 physical-logical address mapping information representing mapping relationship between the logical address input from the host 2000 and the physical address of the allocated page in the allocated memory block 110. Then, the processor 710 of the memory controller 1200 may perform an operation of programming the program data in one or more pages of the allocated memory block 110 of the nonvolatile memory device 1100, based on the physical address.

As another example, when the memory controller 1200 performs an erase operation on a memory block 110 included in the nonvolatile memory device 1100, the physical-logical address mapping information control section 711 of the memory controller 1200 may delete physical-logical address mapping information on the memory block 110 stored in the physical-logical address mapping information storing section 721' of the memory buffer 720.

As another example, when the memory controller 1200 copies data stored in a first memory block 110 included in the nonvolatile memory device 1100 to a second memory block 110 included in the nonvolatile memory device 1100, the physical-logical address mapping information control section 711 of the memory controller 1200 may delete physical-logical address mapping information on the first memory block 110, which is stored in the physical-logical address mapping information storing section 721' of the memory buffer 720, and newly generate physical-logical address mapping information on the second memory block 110.

Figure 9:
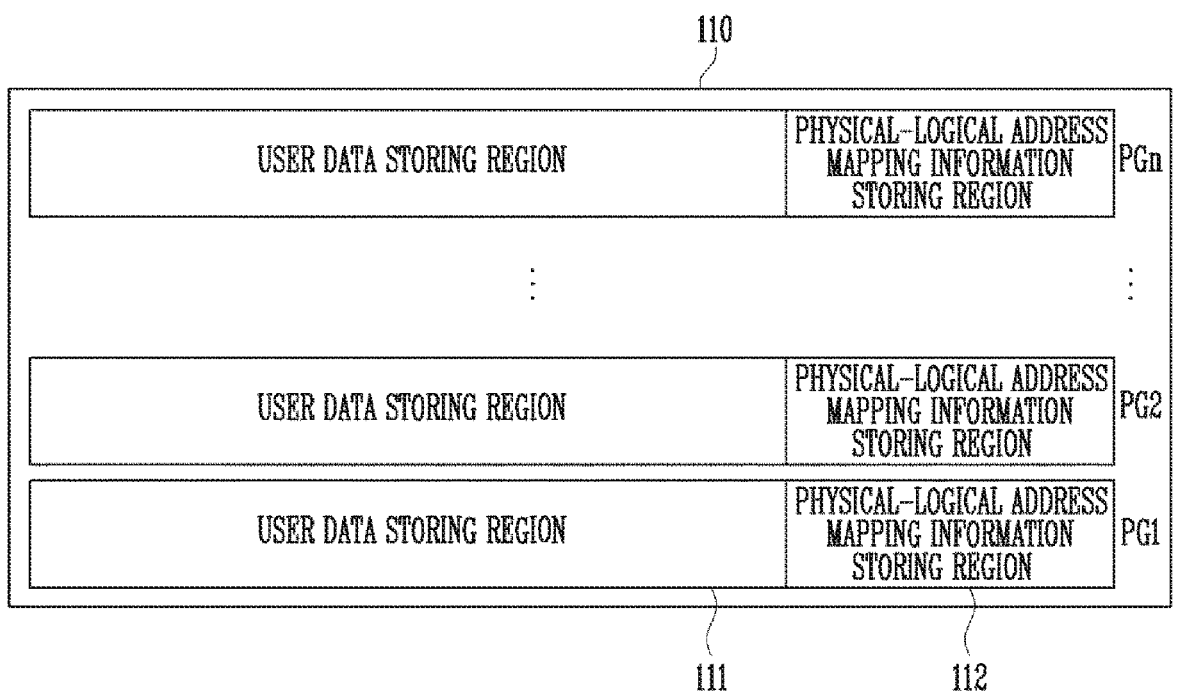
FIG. 9 is a diagram illustrating a memory block according to another embodiment of the present disclosure.

FIG. 9 is a diagram illustrating a memory block according to another embodiment of the present disclosure.

Referring to FIG. 9, the memory block 110 of the nonvolatile memory device 1100 may include a plurality of physical pages, and one physical page may include one or more pages PG. In other words, the memory block 110 of the nonvolatile memory device 1100 may include a plurality of pages PG1 to PGn. As an example, in the case of a single level cell (SLC) that stores data of one bit in one memory cell, one physical page may correspond to one page PG. As another example, in the case of a multi-level cell (MLC) that stores data of two or more bits in one memory cell, one physical page may correspond to two or more pages PG. In the case of the MLC, two or more pages PG corresponding to one physical page may be divided using different threshold voltages. Each page PG may include a user data storing region 111 for storing user data input from the host 2000 and a physical-logical address mapping information storing region 112 for storing physical-logical address mapping information on data of the corresponding page.

When a program command, program page data, and a logical address corresponding to the program command are input from the host 2000 to the memory system 1000, the physical-logical address mapping information control section 711 of the memory controller 1200 may allocate a first page PG1 of the memory block 110 in the nonvolatile memory device 1100 to store the program page data, and store a mapping relationship between the logical address input from the host 2000 and the physical address of the first page PG1 of the allocated memory block 110, i.e., physical-logical address mapping information of the first page PG1 in the physical-logical address mapping information storing section 721 of the buffer memory device 1300 or the physical-logical address mapping information storing section 721' of the memory controller 1200. In addition, the processor 710 of the memory controller 1200 may perform an operation of programming program page data in the user data storing region 111 of the first page PG1 of the allocated memory block 110 of the nonvolatile memory device 1100, based on the physical address. In this case, the physical-logical address mapping information control section 711 of the memory controller 1200 may program physical-logical address mapping information corresponding to the program page data in the physical-logical address mapping information storing region 112 of the first page PG1 of the allocated memory block 110.

When the physical-logical address mapping information is stored in the physical-logical address mapping information storing region 112 of the allocated page of the allocated memory block 110 of the nonvolatile memory device 1100, power loss may occur in the memory system 1000. In this case, although the physical-logical address mapping information stored in the physical-logical address mapping information storing section 721 or 721' is lost due to the power loss, the lost physical-logical address mapping information can be recovered using the physical-logical address mapping information stored in the physical-logical address mapping information storing region 112 of the allocated page of the allocated memory block 110 of the nonvolatile memory device 1100.

Figure 10:
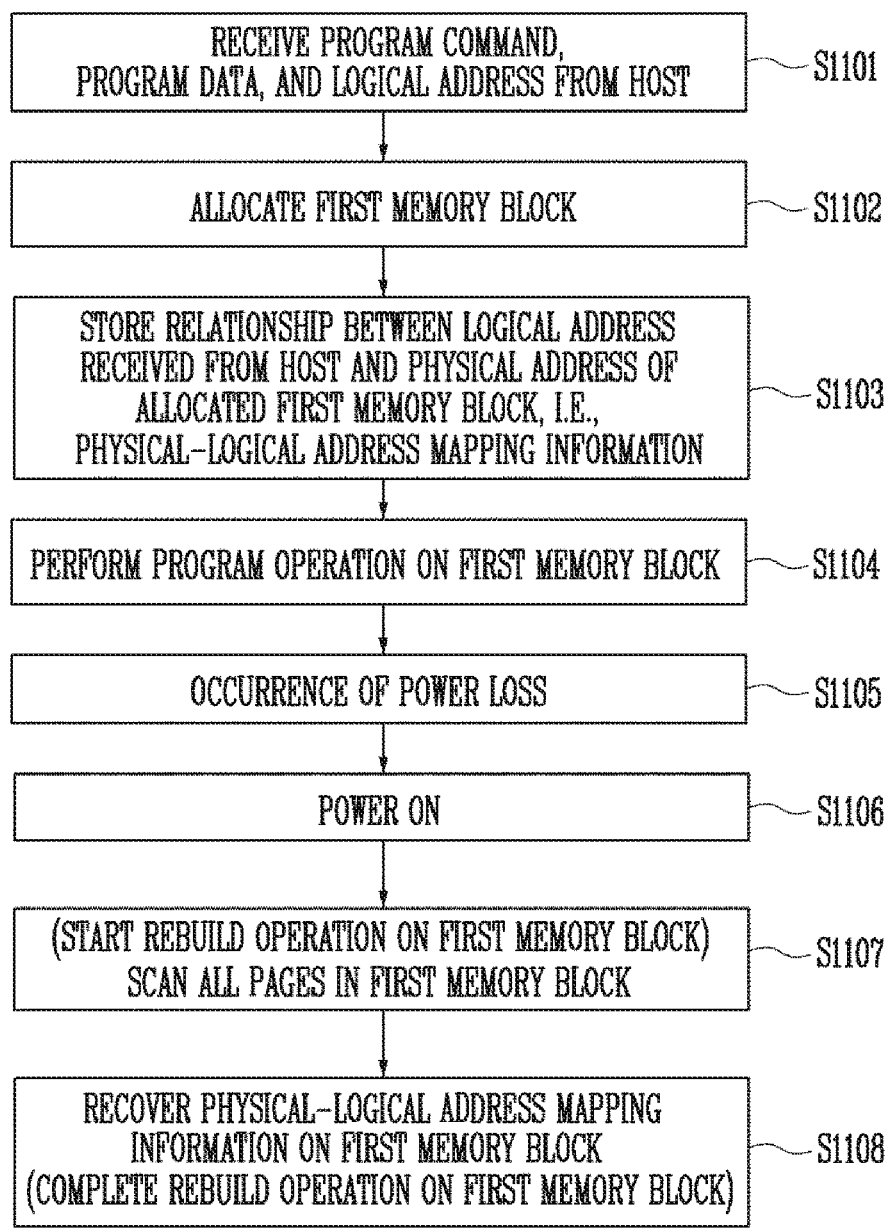
FIG. 10 is a flowchart illustrating a power loss recovery operation according to an embodiment of the present disclosure.

FIG. 10 is a flowchart illustrating a power loss recovery operation according to an embodiment of the present disclosure.

Referring to FIG. 10, the memory system 1000 may receive a program command, program data, and a logical address from the host 2000 at step S1101. The physical-logical address mapping information control section 711 of the memory controller 1200 may allocate a first memory block 110 in response to the program command received from the host 2000 at step S1102. In this case, the physical-logical address mapping information control section 711 may perform an operation of storing a relationship, i.e., physical-logical address mapping information, between the logical address received from the host 2000 and a physical address of a page PG in the allocated first memory block 110 to store the program data in the physical-logical address mapping information storing section 721 at step S1103.

Then, the processor 710 of the memory controller 1200 may perform a program operation on the page PG of the allocated first memory block 110, based on the physical address at step S1104. In this case, the program data received from the host 2000 may be programmed in a user data storing region 111 of the page PG, and a physical-logical address mapping relationship on the program data, i.e., physical-logical address mapping information that is a mapping relationship between the logical address input from the host 2000 and the physical address of the page PG of the allocated first memory block 110 may be stored in a physical-logical address mapping information storing region 112 of the page PG. As another example, only the logical address input from the host 2000 may be stored in the physical-logical address mapping information storing region 112 of the page PG. The program operation may be performed on a plurality of pages PG in the first memory block 110 by repeating the steps S1101 to S1104.

Then, power loss may occur in the memory system 1000 at step S1105. When the power loss occurs in the memory system 1000, the physical-logical address mapping information stored in the physical-logical address mapping information storing section 721 may be lost. Then, power resupply, i.e., power on, may be performed on the memory system 1000 at step S1106.

When the memory system is power on, a power loss recovery operation may be performed. In the power loss recovery operation, the memory system 1000 may perform a rebuild operation on the first memory block 110. The rebuild operation on the first memory block 110 may include an operation of recovering the physical-logical address mapping information of the first memory block 110, which is lost in the physical-logical address mapping information storing section 721 due to the power loss. The memory system 1000 may perform a page scan operation of scanning all pages on which the program operation is being performed in the first memory block 110 at the time of the power loss so as to recover the physical-logical address mapping information of the first memory block 110, which is lost in the physical-logical address mapping information storing section 721 due to the power loss at step S1107. The page scan operation may include an operation of reading data stored in pages PG in a memory block. In addition, the operation of scanning all pages PG in the first memory block 110 may include an operation of reading data stored in all the pages PG in the first memory block 110, on which a program operation is being performed at the time of the power loss.

As described above, the physical-logical address mapping information on the page PG may be stored in the physical-logical address mapping information storing region 112 of the corresponding page PG. Therefore, physical-logical address mapping information of data stored in the first memory block 110 may be read together during the step S1107. The physical-logical address mapping information on the first memory block 110 may be recovered in the physical-logical address mapping information storing section 721 by using the physical-logical address mapping information read from the physical-logical address mapping information storing region 112 of the corresponding page PG at step S1108. The step S1108 may include an operation of rebuilding the physical-logical address mapping information, which is lost in the physical-logical address mapping storing section 721 due to the power loss, by using the physical-logical address mapping information stored in the physical-logical address mapping information storing region 112 of the first memory block 110. Through such an operation, the rebuild operation of the first memory block 110 may be completed.

As described above, the operation of scanning all the pages of the first memory block 110 may be performed so as to recover the physical-logical address mapping information lost in the physical-logical address mapping information storing section 721.

Figure 11:
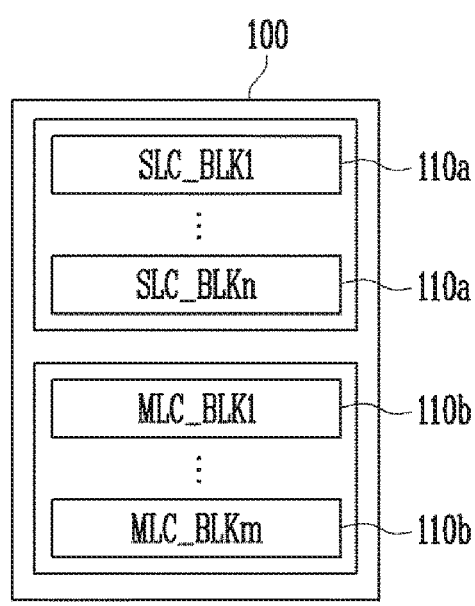
FIG. 11 is a diagram illustrating a memory cell array according to an embodiment of the present disclosure.

FIG. 11 is a diagram illustrating a memory cell array 100 according to an embodiment of the present disclosure.

Referring to FIG. 11, the memory cell array 100 of the nonvolatile memory device 1100 may include a plurality of memory blocks 110. Memory cells included in some parts of the plurality of memory blocks 110 may be used as SLCs for storing data of one bit in one memory cell, and memory cells included in other parts of the plurality of memory blocks 110 may be used as MLCs for storing data of two or more bits in one memory cell. The memory block 110 including SLCs may be referred to as an SLC memory block SLC_BLK 110a, and the memory block 110 including MLCs may be referred to as an MLC memory block MLC_BLK 110b. The memory cell array 100 of the nonvolatile memory device 1100 may include one or more MLC memory blocks MLC_BLK1 to MLC_BLKm 110b and one or more SLC memory blocks SLC_BLK1 to SLC_BLKn 110a (m and n are natural numbers of 2 or more). The SLC and MLC are memory cells physically identical to each other, and the same memory cell may be used as an SLC or MLC by the memory controller 1200 or the nonvolatile memory device 1100.

When data of one bit is stored in a memory cell, i.e., when the memory cell is used as the SLC, the performance of a program operation of storing data in the memory cell may be high as compared with when the memory cell is used as the MLC. In addition, when the memory cell is used as the SLC, the reliability of data stored in the memory cell may be high as compared with when the memory cell is used as the MLC, and the durability of the memory cell against program-erase cycles may be excellent as compared with when the memory cell is used as the MLC.

Figure 12:
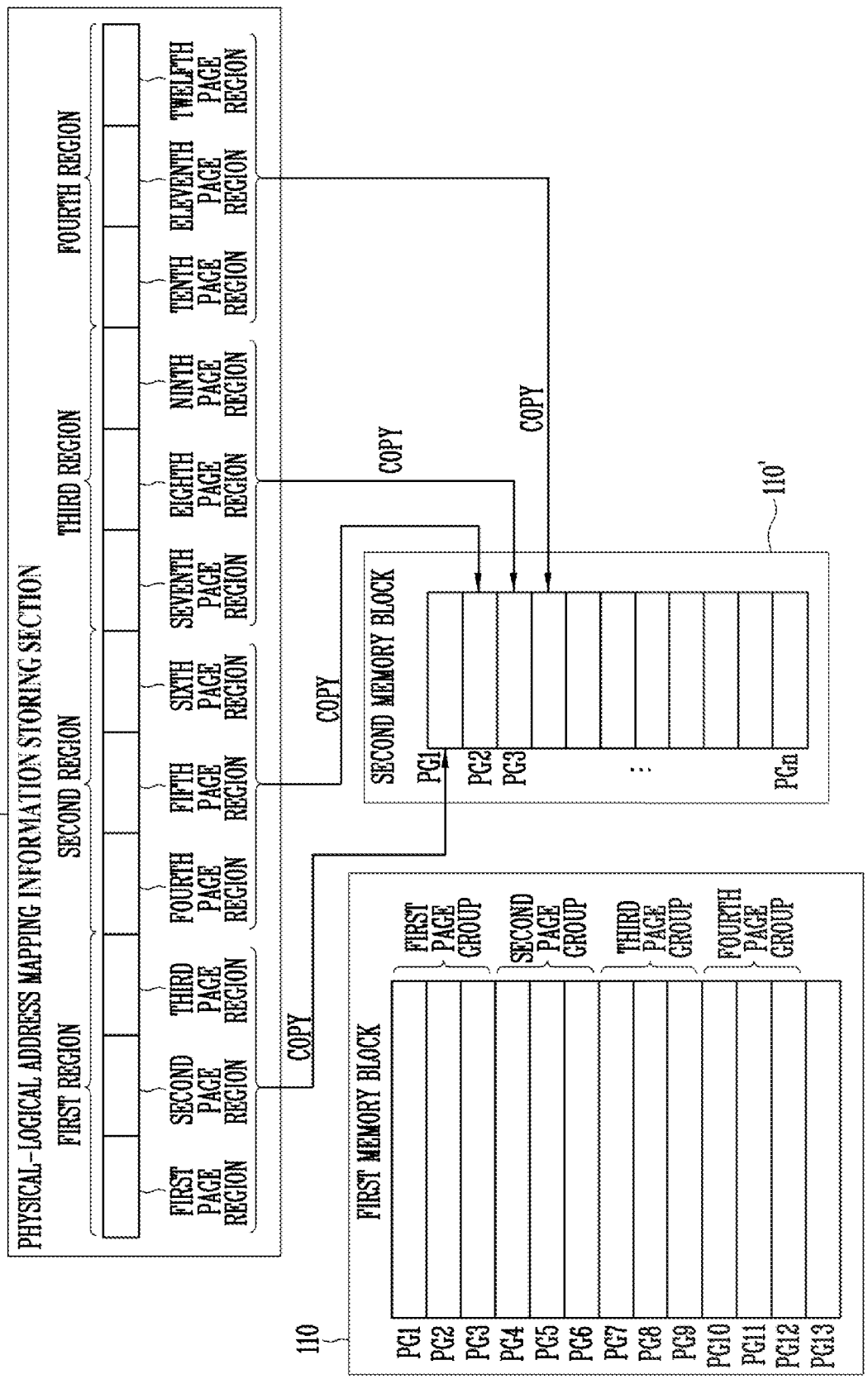
FIG. 12 is a diagram illustrating an operation of storing physical-logical address mapping information according to an embodiment of the present disclosure.

FIG. 12 is a diagram illustrating an operation of storing physical-logical address mapping information according to an embodiment of the present disclosure.

Referring to FIG. 12, the nonvolatile memory device 1100 may include a first memory block 110 and a second memory block 110'. As an example, the first memory block 110 may be an user block storing user data, and the second memory block 110' may be a meta block storing system data such as physical-logical address mapping information. User data input from the host 2000 may be programmed in the first memory block 110, and physical-logical address mapping information on data stored in the first memory block 110 may be stored in the second memory block 110'. The first memory block 110 may include a plurality of page groups, and each page group may include a plurality of pages PG. As an example, when one LPG data is stored in one physical page, the page PG may correspond to one physical page. As another example, when two LPG data are stored in one physical page, one physical page may correspond to two pages PG. In other words, the page PG of FIG. 12 may be a memory space in which one LPG data can be stored. As an example, as shown in FIG. 12, the first memory block 110 may include first to fourth page groups, and each of the first to fourth page groups may include three pages PG.

The physical-logical address mapping information storing section 721 may store physical-logical address mapping information on data programmed in the first memory block 110, which is to be copied into the second memory block 110'. Also, the physical-logical address mapping information storing section 721 may be a DRAM. As an example, the physical-logical address mapping information storing section 721 may include first to fourth regions. The first region may include first to third page regions, the second region may include fourth to sixth page regions, the third region may include seventh to ninth page regions, and the fourth region may include tenth to twelfth page regions.

As an example, the first page region of the first region of the physical-logical address mapping information storing section 721 may store physical-logical address mapping information on page data stored in a first page PG1 of the first page group of the first memory block 110, and the second page region of the first region of the physical-logical address mapping information storing section 721 may store physical-logical address mapping information on page data stored in a second page PG2 of the first page group of the first memory block 110. In addition, the third page region of the first region of the physical-logical address mapping information storing section 721 may store physical-logical address mapping information on page data stored in a third page PG3 of the first page group of the first memory block 110.

Similarly, the fourth to sixth page regions of the second region of the physical-logical address mapping information storing section 721 may store physical-logical address mapping information on page data stored in fourth to sixth pages PG4 to PG6 of the second page group of the first memory block 110, respectively.

In addition, the seventh to ninth page regions of the third region of the physical-logical address mapping information storing section 721 may store physical-logical address mapping information on page data stored in seventh to ninth pages PG7 to PG9 of the third page group of the first memory block 110, respectively.

Further, the tenth to twelfth page regions of the fourth region of the physical-logical address mapping information storing section 721 may store physical-logical address mapping information on page data stored in tenth to twelfth pages PG10 to PG12 of the fourth page group of the first memory block 110, respectively.

When a program operation is performed on the first page PG1 of the first page group of the first memory block 110, physical-logical address mapping information on the first page PG1 of the first page group of the first memory block 110 may be stored in the first page region of the first region of the physical-logical address mapping information storing section 721.

When the program operation is performed on the second page PG2 of the first page group of the first memory block 110, physical-logical address mapping information on the second page PG2 of the first page group of the first memory block 110 may be stored in the second page region of the first region of the physical-logical address mapping information storing section 721.

In addition, when the program operation is performed on the third page PG3 of the first page group of the first memory block 110, physical-logical address mapping information on the third page PG3 of the first page group of the first memory block 110 may be stored in the third page region of the first region of the physical-logical address mapping information storing section 721.

In other words, while the program operation is being sequentially performed on the first to third pages PG1 to PG3 of the first page group of the first memory block 110, the physical-logical address mapping information on the first to third pages PG1 to PG3 of the first page group of the first memory block 110 may be sequentially stored in the first to third page regions of the first region of the physical-logical address mapping information storing section 721.

After the program operation on the first to third pages PG1 to PG3 of the first page group of the first memory block 110 is completed, and the physical-logical address mapping information on the first to third pages PG1 to PG3 of the first page group of the first memory block 110 are all stored in the first to third page regions of the first region of the physical-logical address mapping information storing section 721, the physical-logical address mapping information on the first to third pages PG1 to PG3 of the first page group of the first memory block 110, which are stored in the first region of the physical-logical address mapping information storing section 721, i.e., the entire physical-logical address mapping information on the first page group of the first memory block 110 may be copied in a first page PG1 of the second memory block 110'.

In addition, after the program operation on the fourth to sixth pages PG4 to PG6 of the second page group of the first memory block 110 is completed, and the physical-logical address mapping information on the fourth to sixth pages PG4 to PG6 of the second page group of the first memory block 110 are all stored in the fourth to sixth page regions of the second region of the physical-logical address mapping information storing section 721, the physical-logical address mapping information on the fourth to sixth pages PG4 to PG6 of the second page group of the first memory block 110, which are stored in the second region of the physical-logical address mapping information storing section 721, i.e., the entire physical-logical address mapping information on the second page group of the first memory block 110 may be copied in a second page PG2 of the second memory block 110'.

As another example, when another data, e.g., another log information is programmed in first to mth pages PG1 to PGm (m is a natural number smaller than n) of the second memory block 110', the physical-logical address mapping information on the first page group of the first memory block 110, which is stored in the first region of the physical-logical address mapping information storing section 721, may be copied in an (m+1)th page PGm+1 of the second memory block 110'.

Physical-logical address mapping information on the first page group of the first memory block 110 may be stored in the first region of the physical-logical address mapping information storing section 721, and the physical-logical address mapping information on the first page group of the first memory block 110, which is stored in the first region of the physical-logical address mapping information storing section 721, may be copied in the first page PG1 of the second memory block 110'.

When the program operation on all the page groups of the first memory block 110, i.e., all the pages PG included in the first to fourth page groups is completed, physical-logical address mapping information on the first to fourth page groups of the first memory block 110 may be stored in the first to fourth regions of the physical-logical address mapping information storing section 721. The entire physical-logical address mapping information on the first memory block 110, which is stored in the first to fourth regions of the physical-logical address mapping information storing section 721 may all be stored in the last page, i.e., a thirteenth page PG13 of the first memory block 110.

As another example, after the first memory block 110 is closed, the physical-logical address mapping information control section 711 may store the entire physical-logical address mapping information on the first memory block 110, which is stored in the physical-logical address mapping information storing section 721, in the second memory block 110'.

As another example, after the first memory block 110 is closed, the physical-logical address mapping information control section 711 may store the entire physical-logical address mapping information on the first memory block 110, which is stored in the physical-logical address mapping information storing section 721, in a new memory block 110 instead of the first memory block 110 and the second memory block 110'. In this case, the new memory block 110 may be an SLC memory block 110a.

As another example, when the program operation on the last page group, i.e., the fourth page group of the first memory block 110 is completed, i.e., when physical-logical address mapping information on the fourth page group of the first memory block 110 is stored in the fourth region of the physical-logical address mapping information storing section 721, the physical-logical address mapping information on the fourth page group of the first memory block 110, which is stored in the fourth region of the physical-logical address mapping information storing section 721, may be copied in a fourth page PG4 of the second memory block 110'. Then, the entire physical-logical address mapping information on the first memory block 110, which is stored in the first to fourth regions of the physical-logical address mapping information storing section 721, may all be stored in the last page, i.e., the thirteenth page PG13 of the first memory block 110.

As an example, the physical-logical address mapping information stored in the first to fourth regions of the physical-logical address mapping information storing section 721 are lost after the physical-logical address mapping information on the fourth page group of the first memory block 110 is stored in the fourth page PG4 of the second memory block 110', the physical-logical address mapping information on the first memory block 110, which are stored in the first to fourth pages PG1 to PG4 of the second memory block 110' may be copied to the physical-logical address mapping information storing section 721, and the physical-logical address mapping information on the first memory block 110, which are copied in the physical-logical address mapping information storing section 721, may all be stored in the last page, i.e., the thirteenth page PG13 of the first memory block 110. In this case, the first memory block 110 may be an MLC memory block 110b, and the second memory block 110' may be an SLC memory block 110a.

Figure 13:
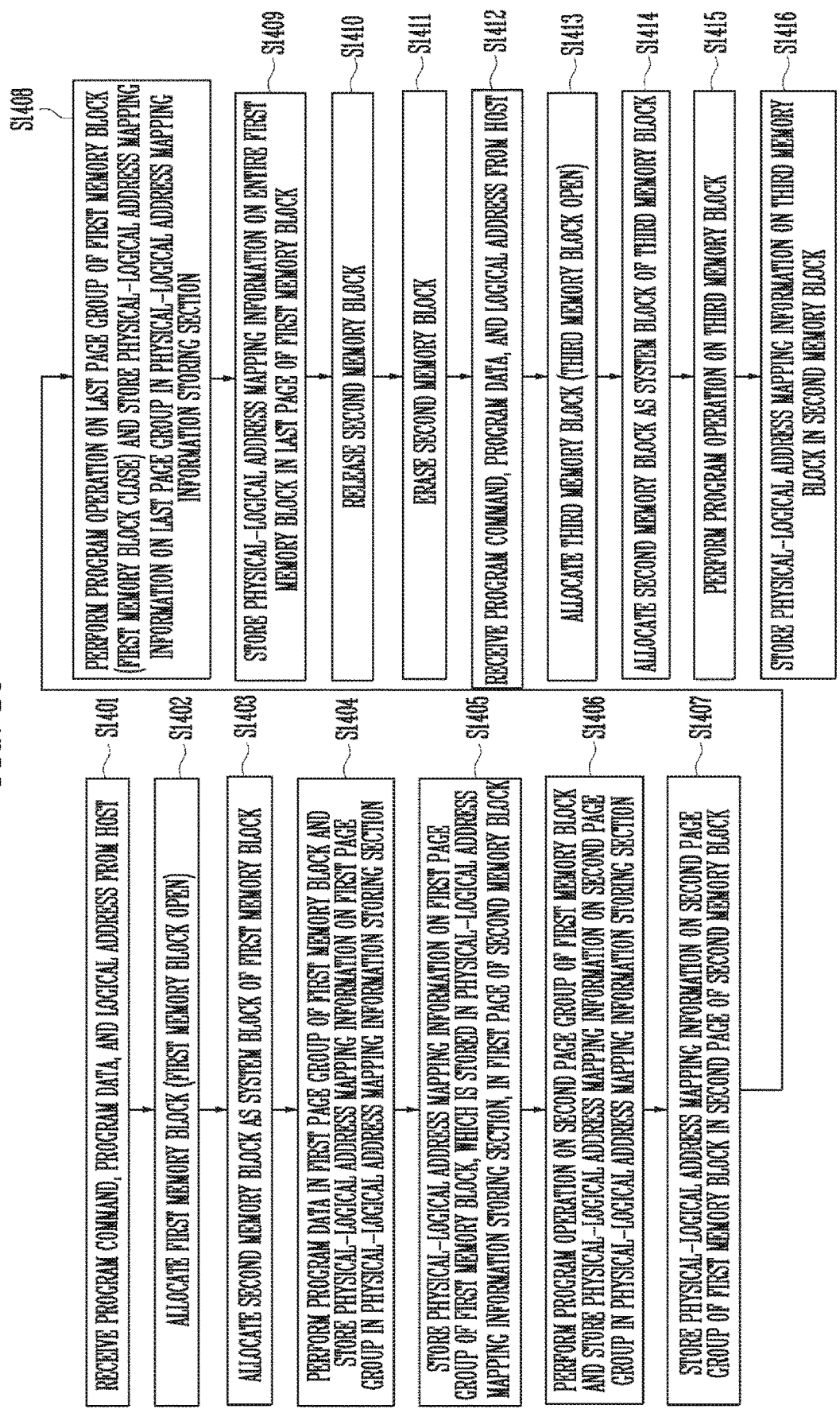
FIG. 13 is a flowchart illustrating an operation of storing physical-logical address mapping information according to an embodiment of the present disclosure.

FIG. 13 is a flowchart illustrating an operation of storing physical-logical address mapping information according to an embodiment of the present disclosure.

Referring to FIG. 13, first, the memory system 1000 may receive a program command, program data, and a logical address from the host 2000 at step S1401.

The physical-logical address mapping information control section 711 may allocate a first memory block 110 to store the program data in response to the program command at step S1402. This may be referred to as "first memory block open". The "memory block open" may mean that a memory block becomes ready to store data.

In addition, the physical-logical address mapping information control section 711 may allocate a second memory block 110' as a system block of the first memory block 110 at step S1403. The system block may store physical-logical address mapping information. In other words, the physical-logical address mapping information control section 711 may allocate the second memory block 110' to store physical-logical address mapping information on the first memory block 110. In this case, the first memory block 110 may be an MLC memory block 110b, and the second memory block 110' may be an SLC memory block 110a.

After the step S1403 is performed, the processor 710 of the memory controller 1200 may program the program data in a page PG of a first page group of the first memory block 110, and the physical-logical address mapping information control section 711 may store physical-logical address mapping information on the page PG of the first page group of the first memory block 110 in the first region of the physical-logical address mapping information storing section 721 at step S1404.

When the program operation on all pages PG included in the first group of the first memory block 110 is completed by performing the steps S1401 to S1404 once or more, the physical-logical address mapping information on the first page group of the first memory block 110, which is stored in the first region of the physical-logical address mapping information storing section 721, may be copied in a first page PG1 of the second memory block 110' by the physical-logical address mapping information control section 711 at step S1405.

When the second memory block 110' is an SLC memory block 110a, the first page PG1 may correspond to one physical page. The first page group may be configured with a plurality of pages. Therefore, in the step of programming the program data in the first page group of the first memory block 110, data on a plurality of pages may be sequentially programmed in units of page data. In this case, whenever each page data is programmed, physical-logical address mapping information on each page data may be stored in a corresponding page region of the first region of the physical-logical address mapping information storing section 721. When the plurality of pages included in the first page group of the first memory block 110 are all programmed through such steps, i.e., when the first region of the physical-logical address mapping information storing section 721 is completely filled, the physical-logical address mapping information on the first page group of the first memory block 110, which is stored in the first region of the physical-logical address mapping information storing section 721, may be copied in the first page PG1 of the second memory block 110' by the physical-logical address mapping information control section 711.

As another example, when another data, e.g., another log information is programmed in first to mth pages PG1 to PGm (m is a natural number smaller than n) of the second memory block 110', the physical-logical address mapping information on the first page group of the first memory block 110, which is stored in the first region of the physical-logical address mapping information storing section 721, may be stored in an (m+1)th page PGm+1 of the second memory block 110'.

After the step S1405 is performed, the processor 710 of the memory controller 1200 may program the program data in a second page group of the first memory block 110, and the physical-logical address mapping information control section 711 may store physical-logical address mapping information on the second page group of the first memory block 110 in a second region of the physical-logical address mapping information storing section 721 at step S1406.

Subsequently, when the program operation on the entire second page group of the first memory block 110 is completed, the physical-logical address mapping information on the second page group of the first memory block 110, which is stored in the second region of the physical-logical address mapping information storing section 721, may be copied in a second page PG2 of the second memory block 110' by the physical-logical address mapping information control section 711 at step S1407.

As described above, the physical-logical address mapping information on the second page group of the first memory block 110 may be sequentially stored in units of page data in the second region of the physical-logical address mapping information storing section 721. After the program operation on the entire second page group of the first memory block 110 is completed, i.e., when the second region of the physical-logical address mapping information storing section 721 is completely filled, the physical-logical address mapping information on the second page group of the first memory block 110, which is stored in the second region of the physical-logical address mapping information storing section 721, may be copied in the second page PG2 of the second memory block 110' by the physical-logical address mapping information control section 711.

The program operation on the last page group of the first memory block 110 may be completed, and physical-logical address mapping information on the last page group of the first memory block 110 may be stored in the last region of the physical-logical address mapping information storing section 721 by the physical-logical address mapping information control section 711 at step S1408.

At this time, any user data program cannot be performed any more on the first memory block 110. This may be referred to as "first memory block close".

After the first memory block 110 is closed, the physical-logical address mapping information control section 711 may copy the entire physical-logical address mapping information on the first memory block 110, which is stored in the physical-logical address mapping information storing section 721, in the last page PG13 of the first memory block 110 at step S1409. The last page PG13 of the first memory block 110 may be a page PG that is not included in any group among the first to last page groups.

Before the step S1409 is performed, the physical-logical address mapping information control section 711 may copy the physical-logical address mapping information on the last page group of the first memory block 110, which is stored in the last region of the physical-logical address mapping information storing section 721, in an nth page PGn of the second memory block 110'.

As another example, after the first memory block 110 is closed, the physical-logical address mapping information control section 711 may copy the entire physical-logical address mapping information on the first memory block 110, which is stored in the physical-logical address mapping information storing section 721, in the second memory block 110'.

As another example, when the first memory block 110 is closed, the physical-logical address mapping information control section 711 may copy the entire physical-logical address mapping information on the first memory block 110, which is stored in the physical-logical address mapping information storing section 721, in a new memory block 110 instead of the first memory block 110 and the second memory block 110'. In this case, the new memory block 110 may be an SLC memory block 110a.

After the step S1409 is performed, it is unnecessary for the second memory block 110' to maintain the stored physical-logical address mapping information, and therefore, the physical-logical address mapping information control section 711 may release the second memory block 110' at step S1410. When the second memory block 110' has been released, it may mean that it is unnecessary to maintain data stored in the second memory block 110' and the second memory block 110' is available for another purpose through an erase operation.

After the step S1410 is performed, the physical-logical address mapping information control section 711 may perform an erase operation on the second memory block 110' at step S1411.

Subsequently, the memory system 1000 may receive a program command, program data, and a logical address from the host 2000 at step S1412.

The physical-logical address mapping information control section 711 may allocate a third memory block 110" to store the program data in response to the program command at step S1413. This may be referred to as "third memory block open".

Then, the physical-logical address mapping information control section 711 may allocate the second memory block 110' as a system block of the third memory block 110" at step S1414. In other words, the second memory block 110' is released, and the erase operation is performed such that the second memory block 110' can be re-used. Therefore, the second memory block 110' may be allocated as a system block of the third memory block 110". As another example, the memory system 1000 may use a plurality of memory blocks 110 as system blocks. In other words, a fourth memory block 110''' instead of the second memory block 110' may be allocated as a system block of the third memory block 110".

Subsequently, the program operation is performed on the third memory block 110" at step S1415, and physical-logical address mapping information on the third memory block 110" may be stored in the second memory block 110' at step S1416.

Figure 14:
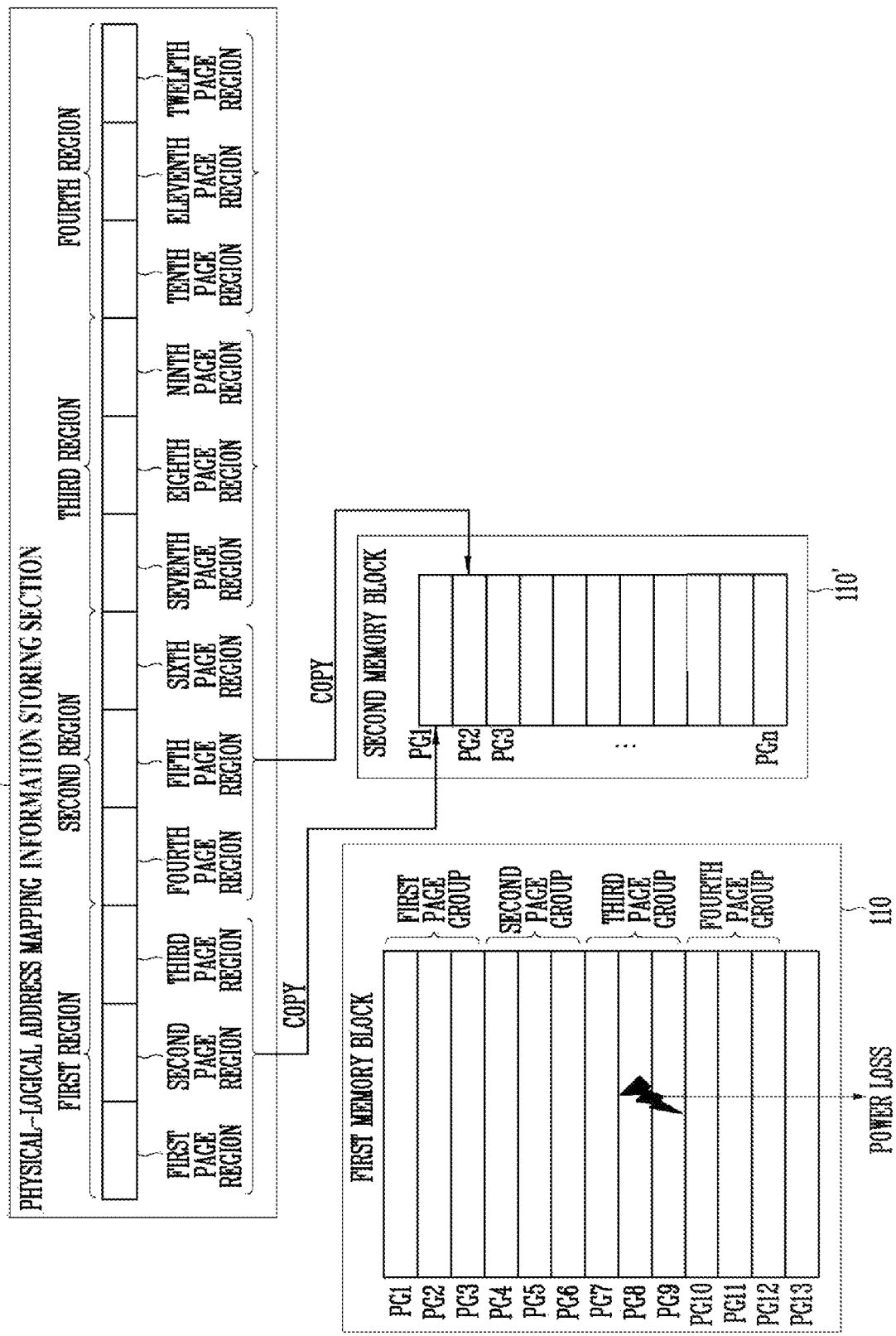
FIG. 14 is a diagram illustrating a power loss recovery operation according to another embodiment of the present disclosure.

FIG. 14 is a diagram illustrating a power loss recovery operation according to another embodiment of the present disclosure.

Referring to FIG. 14, a program operation may be performed on the first to sixth pages PG1 to PG6 included in the first and second page groups of the first memory block 110 and the seventh and eighth pages PG7 and PG8 included in the third page group of the first memory block 110, and physical-logical address mapping information on the first to eighth pages PG1 to PG8 of the first memory block 110 may be stored in the first to eighth page regions of the physical-logical address mapping information storing section 721.

In this case, as described above, physical-logical address mapping information on the first to sixth pages PG of the first and second page groups of the first memory block 110, which are stored in the first and second regions, i.e., the first to sixth page regions of the physical-logical address mapping information storing section 721, may be copied to the first and second pages PG1 to PG2 of the second memory block 110'.

Then, power loss may occur in the memory system 1000 before the ninth page PG9 of the second page group is programmed. As a result, the physical-logical address mapping information on the first memory block 110, which is stored in the physical-logical address mapping information storing section 721, may be lost. Subsequently, the memory system 1000 may power on again, and perform a power loss recovery operation. In this case, the power loss recovery operation may include a first memory block rebuild operation, i.e., an operation of recovering the physical-logical address mapping information on the first memory block 110, which is lost in the physical-logical address mapping information storing section 721 due to the power loss.

The operation of recovering the physical-logical address mapping information on the first memory block 110, which is lost in the physical-logical address mapping information storing section 721, may include an operation of scanning programmed pages PG of the second memory block 110', which store the physical-logical address mapping information on the first memory block 110.

In the above-described example, the second memory block 110' is in a state in which the program operation has been completed up to the second page PG2. Therefore, the physical-logical address mapping information control section 711 may recover the physical-logical address mapping information on the first and second page groups of the first memory block 110 in the physical-logical address mapping information storing section 721 by scanning the first and second pages PG1 and PG2 of the second memory block 110'.

Then, the physical-logical address mapping information control section 711 may perform an operation of scanning programmed pages of the third page group of the first memory block 110, i.e., the seventh and eighth pages PG7 and PG8. Accordingly, the physical-logical address mapping information control section 711 can read physical-logical address mapping information stored in the physical-logical address mapping information storing region 112 of each of the seventh and eighth pages PG7 and PG8 and recover the read physical-logical address mapping information in the physical-logical address mapping information storing section 721.

As a result, the state of the physical-logical address mapping information storing section 721 can be recovered to the state before the power loss occurs. The above-described page scanning operation may include an operation of reading stored data.

As described above, when physical-logical address mapping information on the first memory block 110 is stored in the second memory block 110', the physical-logical address mapping information on the first memory block 110, which is stored in the second memory block 110', can be used in the power loss recovery operation. Accordingly, the number of pages to be scanned for the power loss recovery operation can be decreased, and thus the time required to perform the power loss recovery operation can be reduced.

Figure 15:
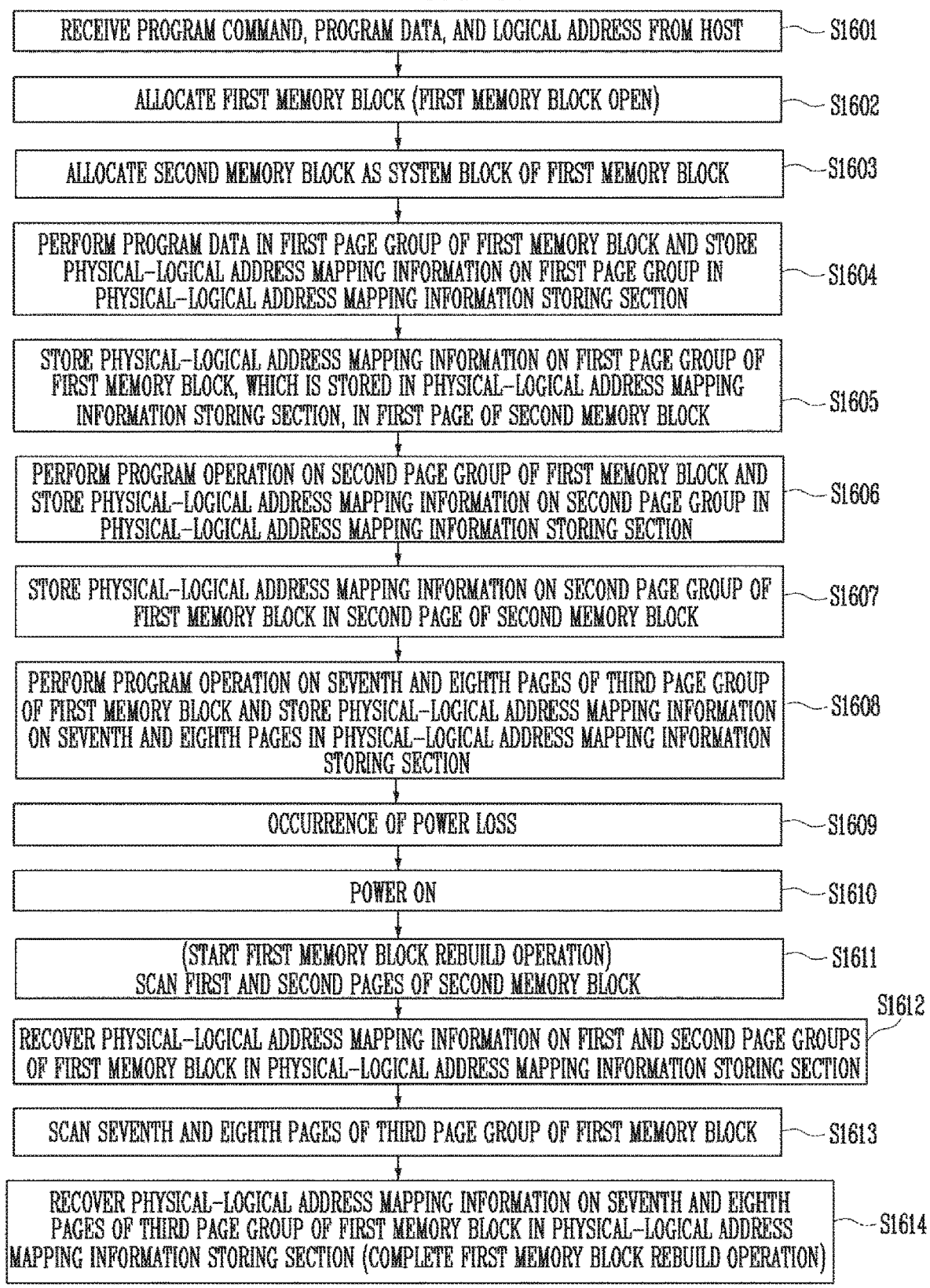
FIG. 15 is a flowchart illustrating a power loss recovery operation according to another embodiment of the present disclosure.

FIG. 15 is a flowchart illustrating a power loss recovery operation according to another embodiment of the present disclosure.

Referring to FIG. 15, first, the memory system 1000 may receive a program command, program data, and a logical address from the host 2000 at step S1601.

The physical-logical address mapping information control section 711 may allocate a first memory block 110 to store the program data in response to the program command at step S1602. This may be referred to as "first memory block open". The "memory block open" may mean that a memory block becomes ready to store data.

In addition, the physical-logical address mapping information control section 711 may allocate a second memory block 110' as a system block of the first memory block 110 at step S1603. The system block may store physical-logical address mapping information. In other words, the physical-logical address mapping information control section 711 may allocate the second memory block 110' to store physical-logical address mapping information on the first memory block 110. In this case, the first memory block 110 may be an MLC memory block 110b, and the second memory block 110' may be an SLC memory block 110a.

After the step S1603 is performed, the processor 710 of the memory controller 1200 may program the program data in a page PG of a first page group of the first memory block 110, and the physical-logical address mapping information control section 711 may store physical-logical address mapping information on the page PG of the first page group of the first memory block 110 in the first region of the physical-logical address mapping information storing section 721 at step S1604.

When the program operation on all pages PG included in the first page group of the first memory block 110 is completed by performing the steps S1601 to S1604 once or more, the physical-logical address mapping information on the first page group of the first memory block 110, which is stored in the first region of the physical-logical address mapping information storing section 721, may be stored in a first page PG1 of the second memory block 110' by the physical-logical address mapping information control section 711 at step S1605.

When the second memory block 110' is an SLC memory block 110a, the first page PG1 may correspond to one physical page. The first page group may be configured with a plurality of pages. Therefore, in the step of programming the program data in the first page group of the first memory block 110, data on a plurality of pages may be sequentially programmed in units of page data. In this case, whenever each page data is programmed, physical-logical address mapping information on each page data may be stored in a corresponding page region of the first region of the physical-logical address mapping information storing section 721.

When the plurality of pages included in the first page group of the first memory block 110 are all programmed through such steps, i.e., when the first region of the physical-logical address mapping information storing section 721 is completely filled, the physical-logical address mapping information on the first page group of the first memory block 110, which is stored in the first region of the physical-logical address mapping information storing section 721, may be copied in the first page PG1 of the second memory block 110' by the physical-logical address mapping information control section 711.

After the step S1605 is performed, the processor 710 of the memory controller 1200 may program the program data in a second page group of the first memory block 110, and the physical-logical address mapping information control section 711 may store physical-logical address mapping information on the second page group of the first memory block 110 in a second region of the physical-logical address mapping information storing section 721 at step S1606.

Subsequently, when the program operation on the entire second page group of the first memory block 110 is completed, the physical-logical address mapping information on the second page group of the first memory block 110, which is stored in the second region of the physical-logical address mapping information storing section 721, may be copied in a second page PG2 of the second memory block 110' by the physical-logical address mapping information control section 711 at step S1607.

As described above, the physical-logical address mapping information on the second page group of the first memory block 110 may be sequentially stored in units of page data in the second region of the physical-logical address mapping information storing section 721. After the program operation on the entire second page group of the first memory block 110 is completed, i.e., when the second region of the physical-logical address mapping information storing section 721 is completely filled, the physical-logical address mapping information on the second page group of the first memory block 110, which is stored in the second region of the physical-logical address mapping information storing section 721, may be copied in the second page PG2 of the second memory block 110' by the physical-logical address mapping information control section 711.

After the step S1607 is performed, a program operation may be performed on seventh and eighth pages PG7 and PG8 of a third page group of the first memory block 110, and physical-logical address mapping information on the seventh and eighth pages PG7 and PG8 may be stored in the physical-logical address mapping information storing section 721 at step S1608.

Then, power loss may occur in the memory system 1000 before a program operation is performed on a ninth page PG9 of the third page group of the first memory block 110 at step S1609. As a result, the physical-logical address mapping information on the first memory block 110, which is stored in the physical-logical address mapping information storing section 721, may be lost.

Subsequently, the memory system 1000 may be again power on at step S1610, and perform a power loss recovery operation. In this case, the power loss recovery operation may include a first memory block rebuild operation, i.e., an operation of recovering the physical-logical address mapping information on the first memory block 110, which is lost in the physical-logical address mapping information storing section 721.

After the step S1610 is performed, there may be performed an operation of scanning programmed pages, i.e., the first and second pages PG1 and PG2 of the second memory block 110', which store the physical-logical address mapping information on the first memory block 110 at step S1611.

The physical-logical address mapping information on the first and second page groups of the first memory block 110, which are read through the step S1611, may be recovered in the physical-logical address mapping information storing section 721 at step S1612. The step S1612 may be controlled by the physical-logical address mapping information control section 711.

Then, there may be performed an operation of scanning programmed pages, i.e., the seventh and eighth pages PG7 and PG8 of the third page group of the first memory block 110 at step S1613. Physical-logical address mapping information on the seventh and eighth pages PG7 and PG8 of the third page group of the first memory block 110 may be read from the physical-logical address mapping information storing region 112 of each of the seventh and eighth pages PG7 and PG8 through the step S1613.

Accordingly, the physical-logical address mapping information on the seventh and eighth pages PG7 and PG8 of the third page group of the first memory block 110 can be recovered in the physical-logical address mapping information storing section 721 at step S1614.

As a result, the entire physical-logical address mapping information on the first memory block 110 is recovered in the physical-logical address mapping information storing section 721, so that the first memory block rebuild operation can be completed.

Figure 16:
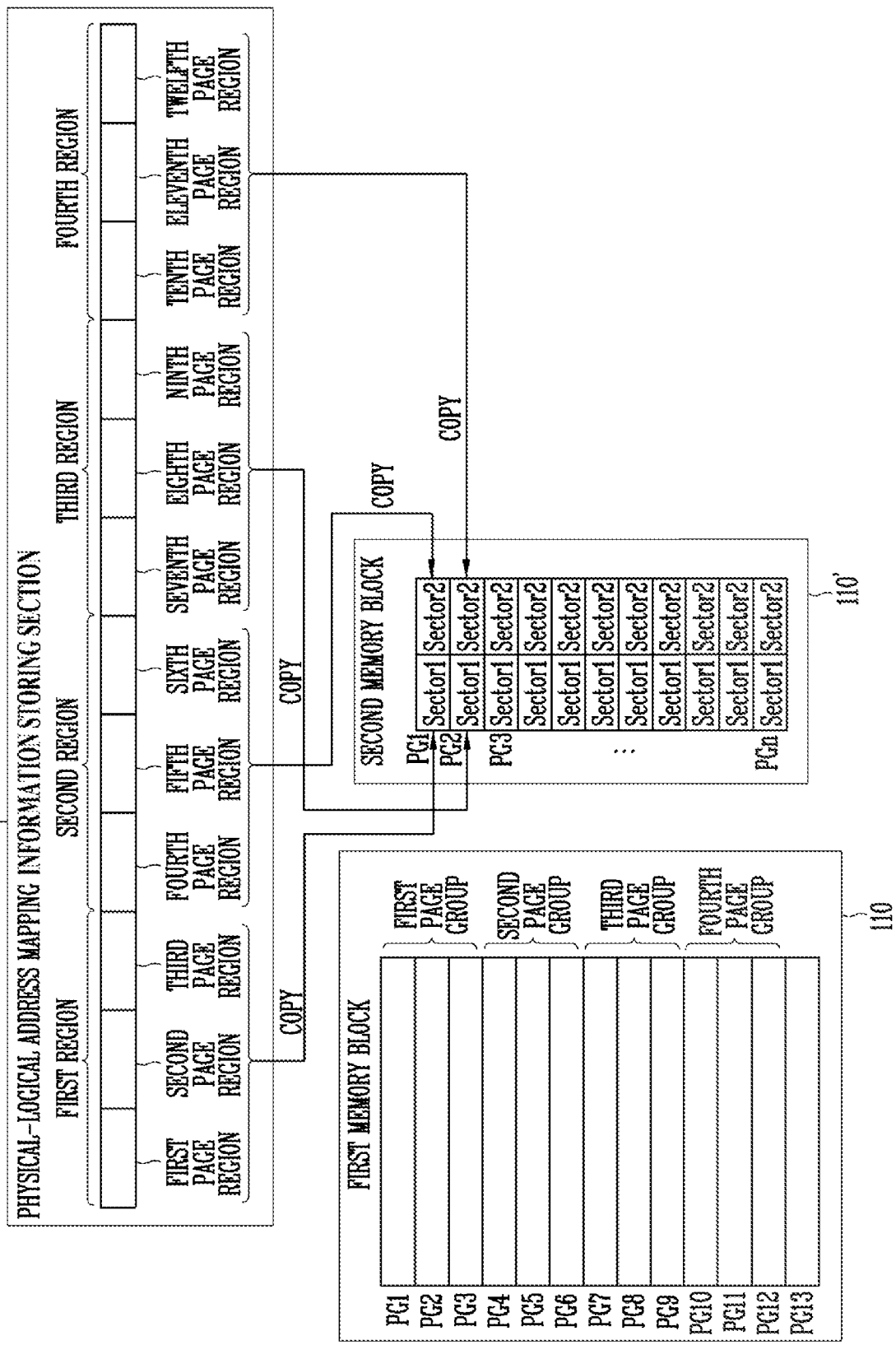
FIG. 16 is a diagram illustrating an operation of storing physical-logical address mapping information according to another embodiment of the present disclosure.

FIG. 16 is a diagram illustrating an operation of storing physical-logical address mapping information according to another embodiment of the present disclosure.

Referring to FIG. 16, each of the pages PG1 to PGn of the second memory block 110' may include first and second sectors Sector1 and Sector1.

Unlike the embodiment described with reference to FIG. 12, physical-logical address mapping information on the first page group of the first memory block 110 may be stored in the first sector Sector1 of the first page PG1 of the second memory block 110', and physical-logical address mapping information on the second page group of the first memory block 110 may be stored in the second sector Sector2 of the first page PG1 of the second memory block 110'.

In other words, the first page region of the first region of the physical-logical address mapping information storing section 721 may store physical-logical address mapping information on page data stored in the first page PG1 of the first page group of the first memory block 110, the second page region of the first region of the physical-logical address mapping information storing section 721 may store physical-logical address mapping information on page data stored in the second page PG2 of the first page group of the first memory block 110, and the third page region of the first region of the physical-logical address mapping information storing section 721 may store physical-logical address mapping information on page data stored in the third page PG3 of the first page group of the first memory block 110.

Then, the physical-logical address mapping information on the first to third pages PG1 to PG3 of the first page group of the first memory block 110, which are stored in the first region of the physical-logical address mapping information storing section 721, may be copied in the first sector Sector1 of the first page PG1 of the second memory block 110'.

Similarly, the fourth page region of the second region of the physical-logical address mapping information storing section 721 may store physical-logical address mapping information on page data stored in the fourth page PG4 of the second group of the first memory block 110, the fifth page region of the second region of the physical-logical address mapping information storing section 721 may store physical-logical address mapping information on page data stored in the fifth page PG5 of the second group of the first memory block 110, and the sixth page region of the second region of the physical-logical address mapping information storing section 721 may store physical-logical address mapping information on page data stored in the sixth page PG6 of the second group of the first memory block 110.

The physical-logical address mapping information on the fourth to sixth pages PG4 to PG6 of the second page group of the first memory block 110, which are stored in the second region of the physical-logical address mapping information storing section 721, may be copied in the second sector Sector2 of the first page PG1 of the second memory block 110'.

Similarly, the third region of the physical-logical address mapping information storing section 721 may store physical-logical address mapping information on data stored in the third page group of the first memory block 110. The physical-logical address mapping information on data stored in the third page group of the first memory block 110, which is stored in the third region of the physical-logical address mapping information storing section 721, may be copied in the first sector Sector1 of the second page PG2 of the second memory block 110'.

In addition, the fourth region of the physical-logical address mapping information storing section 721 may store physical-logical address mapping information on data stored in the fourth page group of the first memory block 110. The physical-logical address mapping information on data stored in the fourth page group of the first memory block 110, which is stored in the fourth region of the physical-logical address mapping information storing section 721, may be copied in the second sector Sector2 of the second page PG2 of the second memory block 110'.

As described above, when physical-logical address mapping information corresponding to a plurality of page groups of the first memory block 110 is stored in one page of the second memory block 110', the second memory block 110' can be more efficiently used. In addition, the time required to perform a power loss recovery operation can be reduced.

Figure 17:
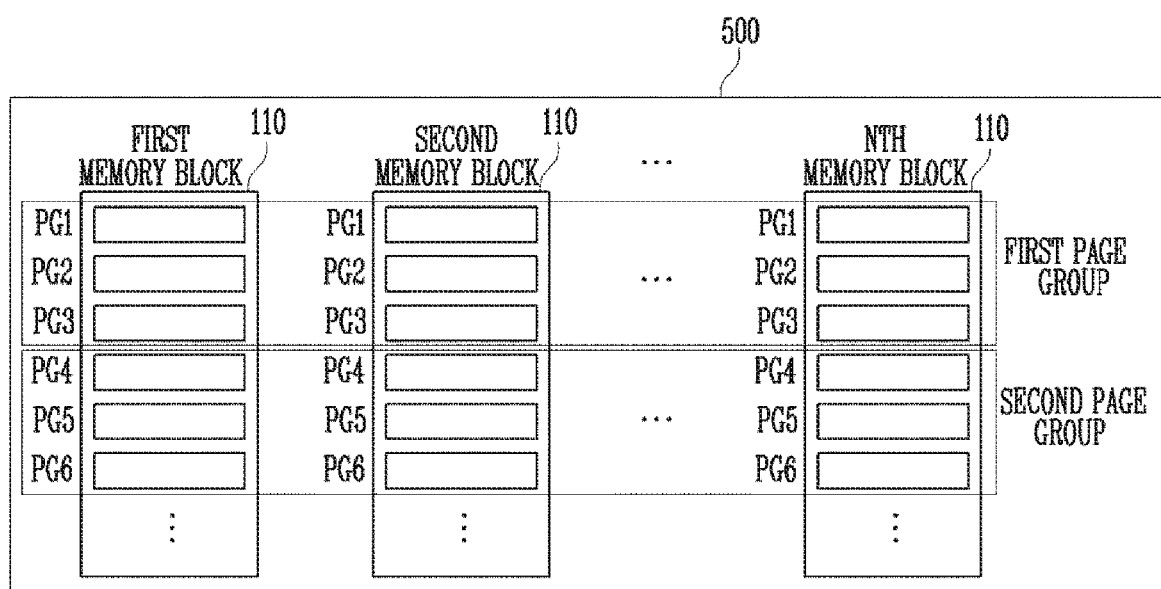
FIG. 17 is a diagram illustrating a page group according to another embodiment of the present disclosure.

FIG. 17 is a diagram illustrating a page group according to another embodiment of the present disclosure.

Referring to FIG. 17, a super block 500 may include a plurality of memory blocks 110, i.e., first to Nth memory blocks 110. The first memory block 110 may be included in a first nonvolatile memory device 1100 constituting a first way, and the second memory block 110 may be included in a second nonvolatile memory device 1100 constituting a second way, and the Nth memory block 110 may be included in an Nth nonvolatile memory device 1100 constituting an Nth way.

Unlike the embodiment described with reference to FIG. 12, a first page group may include first to third pages PG1 to PG3 of the first memory block 110, first to third pages PG1 to PG3 of the second memory block 110, and first to third pages PG1 to PG3 of the Nth memory block 110. In addition, a second page group may include fourth to sixth pages PG4 to PG6 of the first memory block 110, fourth to sixth pages PG4 to PG6 of the second memory block 110, and fourth to sixth pages PG4 to PG6 of the Nth memory block 110.

As an example, a program operation may be performed on the first to third pages PG1 to PG3 of the first to Nth memory blocks 110 of the super block 500, and physical-logical address mapping information on the first to third pages PG1 to PG3 of the first to Nth memory blocks 110 of the super block 500 may be stored in the physical-logical address mapping information storing section 721 and a memory block 110 allocated as a system block of the super block 500.

Then, after a program operation on the fourth pages PG4 of the first to Nth memory blocks 110 is performed, physical-logical address mapping information on the fourth pages PG4 of the first to Nth memory blocks 110 may be stored in the physical-logical address mapping information storing section 721, and power loss may occur in the memory system 1000 before a program operation is performed on the fifth pages PG5 of the first to Nth memory blocks 110. In this case, the physical-logical address mapping information stored in the physical-logical address mapping information storing section 721 may be lost.

The physical-logical address mapping information lost in the physical-logical address mapping information storing section 721 may be recovered during a power loss recovery operation. During the power loss recovery operation, the physical-logical address mapping information on the first to third pages of the first to Nth memory blocks 110 may be read from the memory block 110 that stores physical-logical address mapping information on the super block 500. Then, the physical-logical address mapping information on the first to third pages of the first to Nth memory blocks 110 may be recovered in the physical-logical address mapping information storing section 721. In addition, the physical-logical address mapping information on the fourth pages PG4 of the first to Nth memory blocks 110 may be recovered in the physical-logical address mapping information storing section 721 by scanning the fourth pages PG4 of the first to Nth memory blocks 110.

Figure 18:
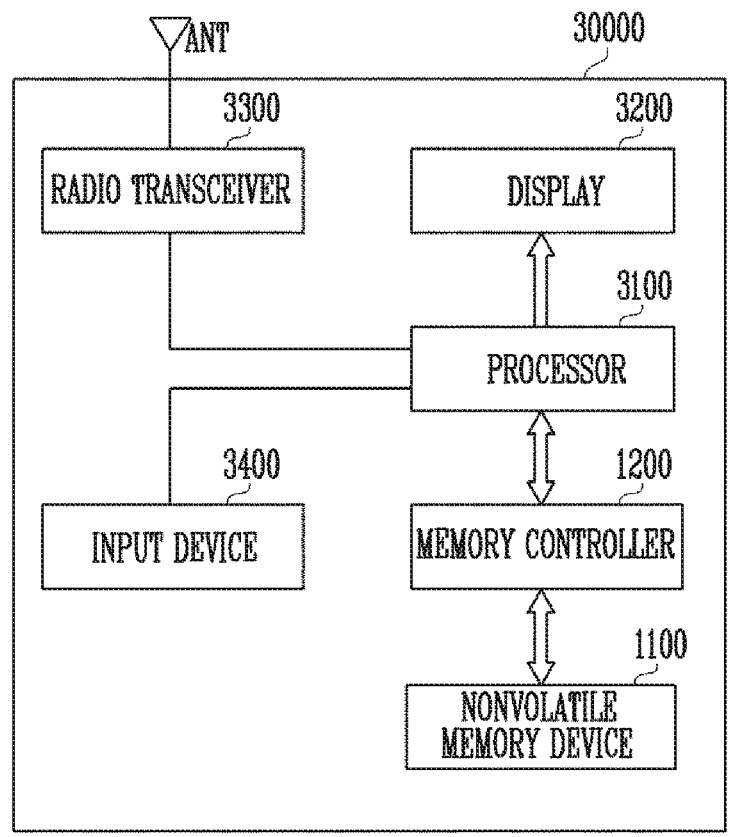
FIG. 18 is a diagram illustrating another embodiment of the memory system including the memory controller shown in FIG. 2.

FIG. 18 is a diagram illustrating another embodiment of the memory system including the memory controller shown in FIG. 2.

Referring to FIG. 18, the memory system 30000 may be implemented as a cellular phone, a smart phone, a tablet PC, a personal digital assistant (PDA), or a wireless communication device. The memory system 30000 may include a nonvolatile memory device 1100 and a memory controller 1200 capable of controlling an operation of the nonvolatile memory device 1100. The memory controller 1200 may control a data access operation of the nonvolatile memory device 1100, e.g., a program operation, an erase operation, or a read operation under the control of a processor 3100.

Data programmed in the nonvolatile memory device 1100 may be output through a display 3200 under the control of the memory controller 1200.

A radio transceiver 3300 may transmit/receive radio signals through an antenna ANT. For example, the radio transceiver 3300 may convert a radio signal receive through the antenna ANT into a signal that can be processed by the processor 3100. Therefore, the processor 3100 may process a signal output from the radio transceiver 3300 and transmit the processed signal to the memory controller 1200 or the display 3200. The memory controller 1200 may program the signal processed by the processor 3100 in the nonvolatile memory device 1100.

Also, the radio transceiver 3300 may convert a signal output from the processor 3100 into a radio signal, and output the converted radio signal to an external device through the antenna ANT. An input device 3400 is a device capable of inputting a control signal for controlling an operation of the processor 3100 or data to be processed by the processor 3100, and may be implemented as a pointing device such as a touch pad or a computer mount, a keypad, or a keyboard. The processor 3100 may control an operation of the display 3200 such that data output from the memory controller 1200, data output from the radio transceiver 3300, or data output from the input device 3400 can be output through the display 3200.

In some embodiments, the memory controller 1200 capable of controlling an operation of the nonvolatile memory device 1100 may be implemented as a part of the processor 3100, or be implemented as a chip separate from the processor 3100. Also, the memory controller 1200 may be implemented with the memory controller shown in FIG. 7.

Figure 19:
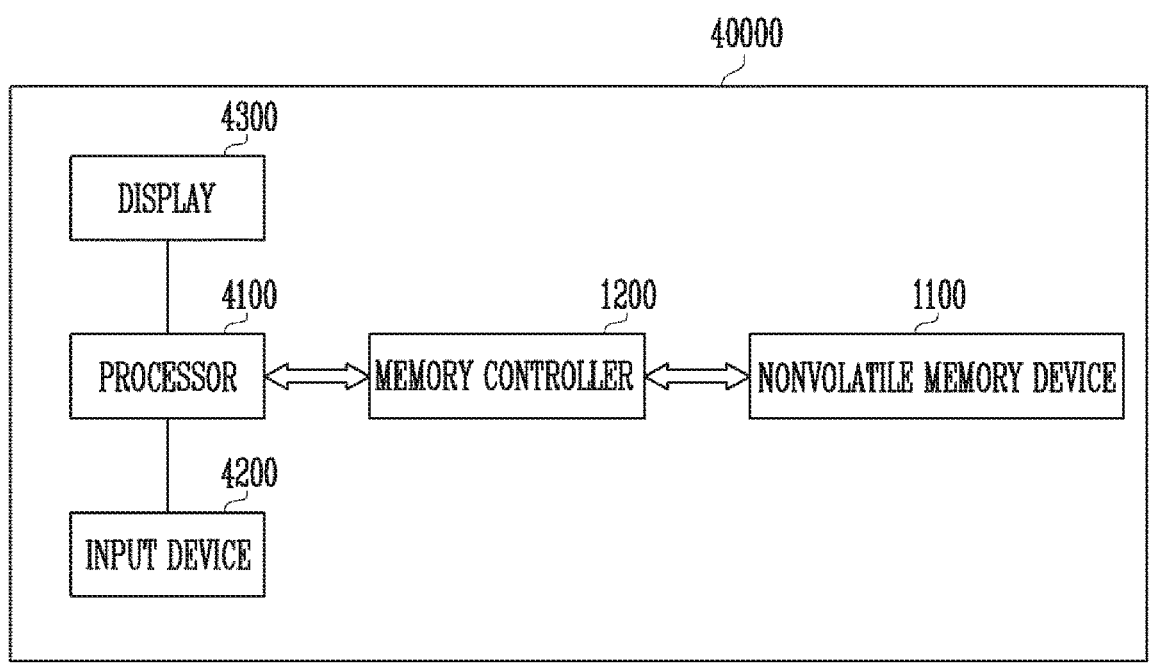
FIG. 19 is a diagram illustrating another embodiment of the memory system including the memory controller shown in FIG. 2.

FIG. 19 is a diagram illustrating another embodiment of the memory system including the memory controller shown in FIG. 2.

Referring to FIG. 19, the memory system 40000 may be implemented as a personal computer (PC), a tablet PC, a net-book, an e-reader, a personal digital assistant (PDA), a portable multimedia player (PMP), an MP3 player, or an MP4 player.

The memory system 40000 may include a nonvolatile memory device 1100 and a memory controller 1200 capable of controlling a data processing operation of the nonvolatile memory device 1100.

The processor 4100 may output data stored in the nonvolatile memory device 1100 through a display 4300 according to data input through an input device 4200. For example, the input device 4200 may be implemented as a pointing device such as a touch pad or a computer mouse, a keypad, or a keyboard.

The processor 4100 may control overall operations of the memory system 40000, and control an operation of the memory controller 1200. In some embodiments, the memory controller 1200 capable of controlling an operation of the nonvolatile memory device 1100 may be implemented as a part of the processor 4100, or be implemented as a chip separate from the processor 4100. Also, the memory controller 1200 may be implemented with the memory controller shown in FIG. 7.

Figure 20:
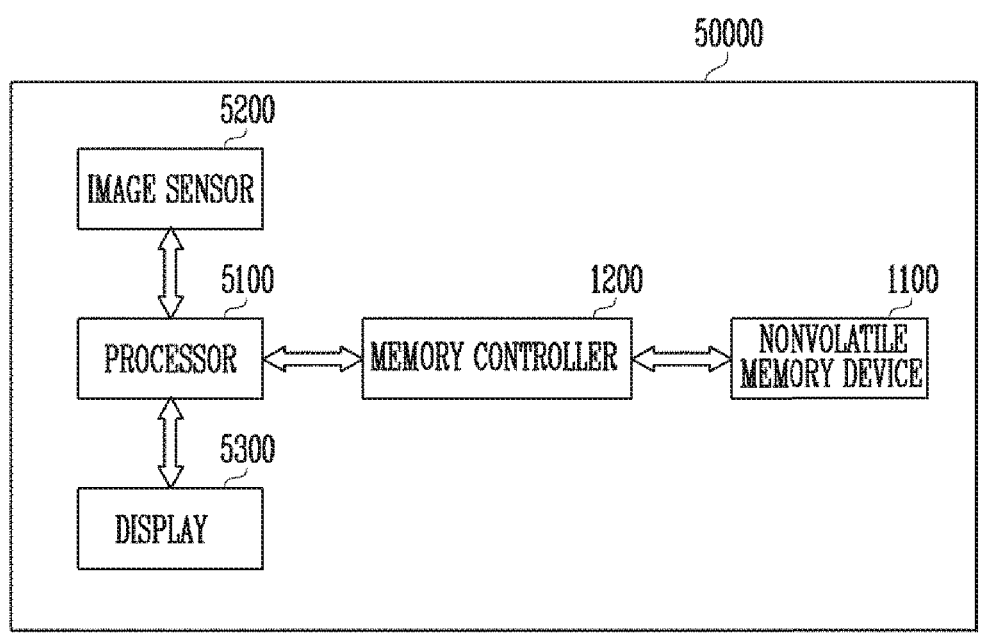
FIG. 20 is a diagram illustrating another embodiment of the memory system including the memory controller shown in FIG. 2.

FIG. 20 is a diagram illustrating another embodiment of the memory system including the memory controller shown in FIG. 2.

Referring to FIG. 20, the memory system 50000 may be implemented as an image processing device, e.g., a digital camera, a mobile terminal having a digital camera attached thereto, a smart phone having a digital camera attached thereto, or a tablet PC having a digital camera attached thereto.

The memory system 50000 may include a nonvolatile memory device 1100 and a memory controller 1200 capable of controlling a data processing operation of the nonvolatile memory device 1100, e.g., a program operation, an erase operation, or a read operation.

An image sensor 5200 of the memory system 50000 may convert an optical image into digital signals, and the converted digital signals may be transmitted to the processor 5100 or the memory controller 1200. Under the control of the processor 5100, the converted digital signals may be output through a display 5300, or be stored in the nonvolatile memory device 1100 through the memory controller 1200. In addition, data stored in the nonvolatile memory device 1100 may be output through the display 5300 under the control of the processor 5100 or the memory controller 1200.

In some embodiments, the nonvolatile memory controller 1200 capable of controlling an operation of the nonvolatile memory device 1100 may be implemented as a part of the processor 5100, or be implemented as a chip separate from the processor 5100. Also, the memory controller 1200 may be implemented with the memory controller shown in FIG. 7.

Figure 21:
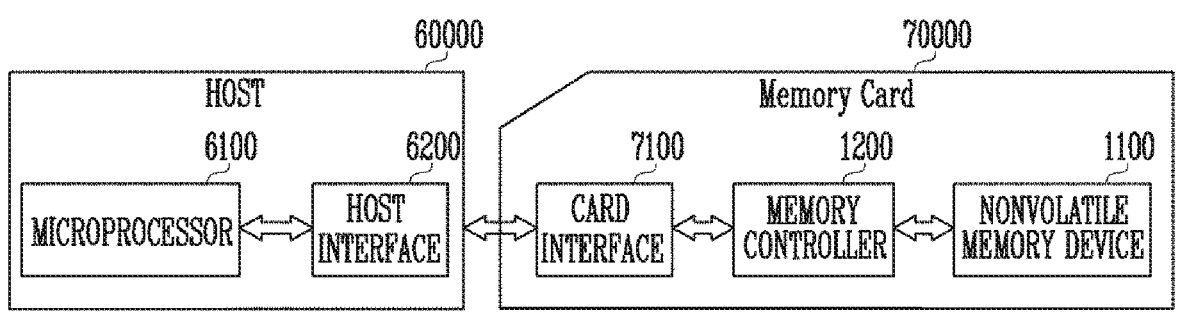
FIG. 21 is a diagram illustrating another embodiment of the memory system including the memory controller shown in FIG. 2.

FIG. 21 is a diagram illustrating another embodiment of the memory system including the memory controller shown in FIG. 2.

Referring to FIG. 21, the memory system 70000 may be implemented as a memory card or a smart card. The memory system 70000 may include a nonvolatile memory device 1100, a memory controller 1200, and a card interface 7100.

The memory controller 1200 may control data exchange between the nonvolatile memory device 1100 and the card interface 7100. In some embodiments, the card interface 7100 may be a secure digital (SD) card interface or a multi-media card (MMC) interface, but the present disclosure is not limited thereto. Also, the memory controller 1200 may be implemented with the memory controller shown in FIG. 7.

The card interface 7100 may interface data exchange between a host 60000 and the memory controller 1200 according to a protocol of the host 60000. In some embodiments, the card interface 7100 may support a universal serial bus (USB) protocol and an inter-chip (IC)-USB protocol. Here, the card interface 7100 may mean hardware capable of supporting a protocol used by the host 60000, software embedded in the hardware, or a signal transmission scheme.

When the memory system 70000 is coupled to a host interface 6200 of the host 60000 such as a PC, a tablet PC, a digital camera, a digital audio player, a cellular phone, console video game hardware, or a digital set-top box, the host interface 6200 may perform data communication with the nonvolatile memory device 1100 through the card interface 7100 and the memory controller 1200 under the control of a microprocessor 6100.

According to the present disclosure, in an operation of the memory system, the time required to perform the power loss recovery operation of the memory system can be reduced using the SLC memory block that stores the physical-logical address mapping information.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A method for operating a memory system, the method comprising:
performing a program operation on a first page of a first page group included in a first memory block and storing physical-logical address mapping information on the first page in a physical-logical address mapping information storing section;
performing a program operation on a second page of the first page group included in the first memory block and storing physical-logical address mapping information on the second page in the physical-logical address mapping information storing section; and
copying the physical-logical address mapping information on the first and second pages of the first page group, which are stored in the physical-logical address mapping information storing section, to a second memory block,
wherein the physical-logical address mapping information on the first and second pages of the first page group, which is stored in the physical-logical address mapping information storing section, is copied in a first page of the second memory block.

2. The method of claim 1, further comprising:
performing a program operation on the last page of the last page group included in the first memory block and storing physical-logical address mapping information on the last page of the last page group in the physical-logical address mapping information storing section; and
storing the entire physical-logical address mapping information on the first memory block, which is stored in the physical-logical address mapping information storing section, in a page included in the first memory block.

3. The method of claim 2, further comprising, after the storing the entire physical-logical address mapping information, releasing the second memory block.

4. The method of claim 3, further comprising:
receiving a program command and data from a host;
allocating a third memory block for storing the data in response to the program command; and
allocating the second memory block to store physical-logical address mapping information on the third memory block.

5. The method of claim 3, wherein the second memory block is a single level cell (SLC) memory block.

6. The method of claim 1, wherein the physical-logical address mapping information on the first page group, which is stored in the physical-logical address mapping information storing section, is copied in a first sector of the first page of the second memory block, and
the physical-logical address mapping information on a second page group, which is stored in the physical-logical address mapping information storing section, is copied in a second sector of the first page of the second memory block.

7. A method for operating a memory system, the method comprising:
performing a program operation on a first page of a first page group included in a first memory block and storing physical-logical address mapping information on the first page in a physical-logical address mapping information storing section;
performing a program operation on a second page of the first page group included in the first memory block and storing physical-logical address mapping information on the second page in the physical-logical address mapping information storing section;
copying the physical-logical address mapping information on the first and second pages of the first page group, which are stored in the physical-logical address mapping information storing section, to a second memory block,
performing a program operation on a third page of a second page group included in the first memory block and storing physical-logical address mapping information on the third page in the physical-logical address mapping information storing section;
allowing power loss to occur in the memory system; and a recovery phase of recovering the physical-logical address mapping information on the first memory block, which is lost in the physical-logical address mapping information storing section due to the power loss, wherein the recovery phase includes:

recovering the physical-logical address mapping information on the first page group by scanning the second memory block; and recovering the physical-logical address mapping information on the third page by scanning the third page of the first memory block.

8. The method of claim 7, wherein the performing of the program operation on the first page includes an operation of programming the physical-logical address mapping information on the first page in a physical-logical address mapping information storing region of the first page.

9. The method of claim 7, wherein the physical-logical address mapping information storing section includes a dynamic random access memory (DRAM).

10. A memory system comprising:

a memory device including first and second memory blocks; and a controller including a volatile memory, and suitable for:

controlling the memory device to program user data and physical-logical address mapping information of the user data in first and second regions of the first memory block, respectively;

storing the physical-logical address mapping information in the volatile memory; and controlling the memory device to copy the physical-logical address mapping information from the volatile memory into a third region of the first memory block when the first region is full of the user data, wherein the controller further controls the memory device to temporarily copy the physical-logical address mapping information from the volatile memory into the second memory block until the physical-logical address mapping information is copied into the third region, wherein the controller further rebuilds the physical-logical address mapping information, which is lost in the volatile memory due to a sudden power-off, using the physical-logical address mapping information programmed in the second region and the second memory block.

\* \* \* \* \*